(12) United States Patent
Paepcke et al.

(10) Patent No.: US 11,671,563 B2
(45) Date of Patent: *Jun. 6, 2023

(54) SYSTEMS AND METHODS FOR TELEPRESENCE ROOMS

(71) Applicant: Toyota Research Institute, Inc., Los Altos, CA (US)

(72) Inventors: Stephanie Paepcke, Mountain View, CA (US); Katherine Tsui, Watertown, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,900

(22) Filed: Jun. 1, 2022

(65) Prior Publication Data
US 2022/0295015 A1 Sep. 15, 2022

Related U.S. Application Data

(63) Continuation of application No. 17/155,639, filed on Jan. 22, 2021, now Pat. No. 11,388,371.

(51) Int. Cl.
H04N 7/15 (2006.01)
G06F 3/01 (2006.01)
G06T 19/00 (2011.01)
A47C 17/86 (2006.01)
A47C 7/74 (2006.01)
A47C 7/72 (2006.01)

(52) U.S. Cl.
CPC ............. *H04N 7/157* (2013.01); *G06F 3/011* (2013.01); *G06T 19/006* (2013.01); *A47C 7/723* (2018.08); *A47C 7/748* (2013.01); *A47C 17/86* (2013.01)

(58) Field of Classification Search
CPC .................................. H04N 7/157; H04N 7/15
See application file for complete search history.

(56) References Cited

U.S. PATENT DOCUMENTS

| 6,553,355 | B1 | 4/2003 | Arnoux et al. |
| 8,355,041 | B2* | 1/2013 | Chen .................... H04N 19/154 348/36 |
| 9,270,940 | B1* | 2/2016 | Aravkin ................. H04N 7/147 |
| 9,325,943 | B2* | 4/2016 | Wilson .................. G06F 3/0304 |
| 9,584,766 | B2* | 2/2017 | Pradeep ................. H04N 7/157 |
| 9,749,367 | B1* | 8/2017 | Kirby ................... G06Q 10/101 |
| 10,242,501 | B1 | 3/2019 | Pusch et al. |
| 10,716,192 | B1 | 7/2020 | Tsibulevskiy |

(Continued)

*Primary Examiner* — Olisa Anwah
(74) *Attorney, Agent, or Firm* — Dinsmore & Shohl LLP

(57) ABSTRACT

A system that has a plurality of monitors, a control unit, a first object and a second object is provided. The second object has one or more sensors operable to generate data and is remote from the first object. The control unit is configured to determine whether a first user is positioned on a first or on a second location of the first object and display a simulation of a second user onto the plurality of monitors based on the generated data. The second user is located remote from the first user and is displayed as being positioned in a different location on the first object than the first user on the first object. The control unit is further configured to activate the one or more heat generating devices to simulate a presence of the second user being positioned in the different location on the first object.

20 Claims, 8 Drawing Sheets

(56) References Cited

U.S. PATENT DOCUMENTS

| | | | | |
|---|---|---|---|---|
| 10,930,265 B2* | 2/2021 | Rakshit | ............ | G06V 40/20 |
| 2002/0010734 A1 | 1/2002 | Ebersole et al. | | |
| 2010/0306647 A1 | 12/2010 | Zhang et al. | | |
| 2011/0295392 A1* | 12/2011 | Cunnington | ........ | G06Q 10/10 |
| | | | | 702/19 |
| 2012/0281059 A1* | 11/2012 | Chou | ............ | H04L 12/1827 |
| | | | | 348/E7.083 |
| 2014/0022331 A1* | 1/2014 | Bansal | ............ | H04N 7/142 |
| | | | | 348/14.07 |
| 2019/0227419 A1* | 7/2019 | McNelley | ......... | G03B 21/60 |
| 2021/0367985 A1* | 11/2021 | Bansal | ............ | H04N 7/147 |
| 2021/0383804 A1* | 12/2021 | Makker | ............ | G06F 3/011 |

* cited by examiner

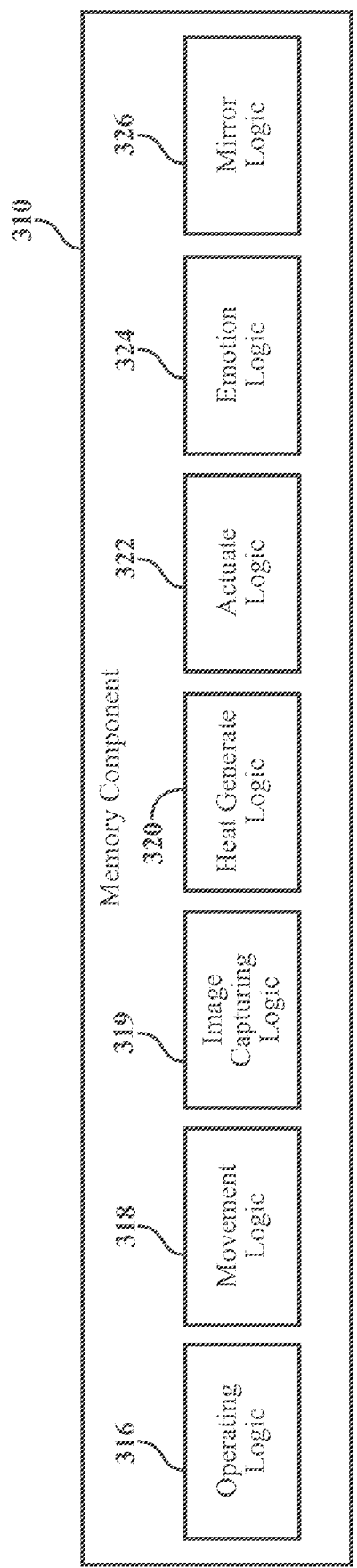
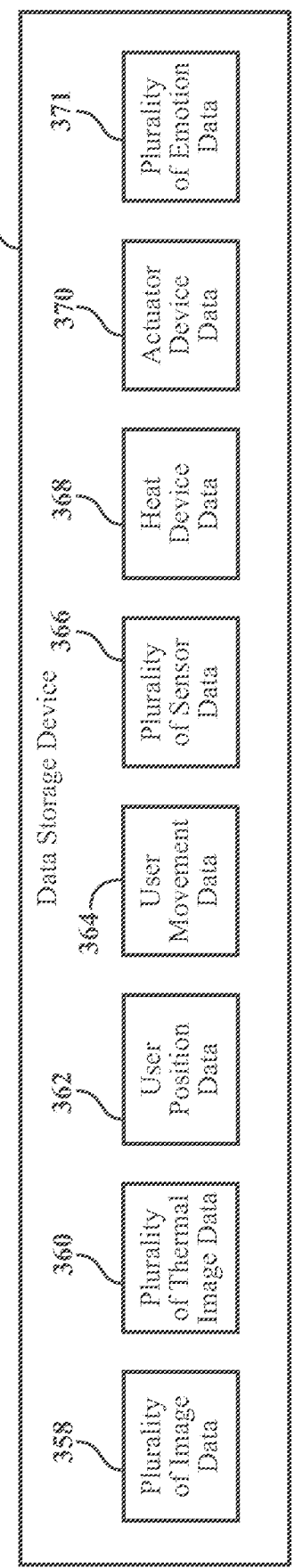
FIG. 3B
FIG. 3C

SYSTEMS AND METHODS FOR TELEPRESENCE ROOMS

CROSS-REFERENCE TO RELATED APPLICATIONS

The present application is a continuation of co-pending U.S. application Ser. No. 17/155,639, filed on Jan. 22, 2021, the contents of which are incorporated herein by reference in its entirety.

TECHNICAL FIELD

The present specification generally relates to telepresence rooms, and more specifically, to telepresence room systems that enhance a sensation of additional remote users being present in the telepresence room.

BACKGROUND

Conventional teleconferencing systems allow users to interact with remotely located users by providing audio and video feeds, thereby providing the users to feel as if they are more present with one another. A telepresence room is an immersive room that employs wall monitors to simulate remote users being located in the same room. User one may be in a first telepresence room and user two may be in another remote telepresence room. The monitors of each room may be made to simulate that the two users are within the same room such that they may converse as if they are in the same room. However, while the monitors may assist in simulating the other user is in the same room, there is not a sensation that the other user is in the same room.

Accordingly, a need exists for telepresence systems that provide users with a sensation that each other are present in the same room.

SUMMARY

In one embodiment, a system that has a plurality of monitors, a control unit, a first object and a second object is provided. The first object has a first location and a second location. One or more heat generating devices are positioned within the first object. The second object has one or more sensors operable to generate data and the second object is remote from the first object. The control unit is configured to determine whether a first user is positioned on the first location or on the second location of the first object positioned within a room and display a simulation of a second user onto the plurality of monitors disposed in the room based on the generated data. The second user is located remote from the first user and the second user is displayed as being positioned in a different location on the first object than the determined location of the first user on the first object. The control unit is further configured to activate the one or more heat generating devices to simulate a presence of the second user being positioned in the different location on the first object such that the second user is simulated as being positioned within the room and on the first object along with the first user.

In another embodiment, a method of enhancing a sensation of a second user being present in a telepresence room in which the second user is remote to the telepresence room is provided. The method includes determining, by one or more sensors, a location of a first user within the telepresence room, the telepresence room having a plurality of monitors and a first object, wherein the first object has a plurality of locations for the first user to be positioned thereon determining, by the one or more sensors, a generated data of a position of the second user positioned on a second object and displaying, by a control unit onto the plurality of monitors disposed in the telepresence room, a simulation of the second user positioned on the first object in a location of the plurality of locations that is different from the determined location of the first user. The method continues by activating, by the control unit, at least one actuator positioned within the first object and activating, by the control unit, one or more heat generating devices positioned within the first object. The second user is simulated as being positioned on the first object adjacent to the first user by a movement caused by the at least one actuator, a heat generated by the one or more heat generating devices and a simulated display of the second user on the plurality of monitors.

In yet another embodiment, a telepresence system is provided. The telepresence system includes a plurality of monitors, a control unit, a first object and a second object. The first object has a first location position and a second location position and one or more heat generating devices positioned within the first object. The second object has one or more sensors operable to generate data and the second object is remote to the first object. The control unit is configured to determine whether a first user is positioned on the first location position or on the second location position of the first object within a room and display a simulation of a second user onto the plurality of monitors based on the generated data of a determined location of the second user position on the second object. The second user is located remote from the first user, and the second user is displayed as being positioned in a different location position on the first object than the determined location position of the first user on the first object. The control unit is further configured to receive an emotion data indicative of an emotion of the second user, determine an emotion type of the emotion data, determine a plurality of predetermined emotion properties, and activate the one or more heat generating devices based on the plurality of predetermined emotion properties to simulate the emotion of the second user such that the emotion of the second user is simulated to the first user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3B schematically depicts logic modules of an example memory component and of the example first electronic control unit of FIG. 3A according to one or more embodiments described and illustrated herein;

FIG. 3C schematically depicts example data stored within an example data storage device of the example first electronic control unit of FIG. 3A according to one or more embodiments described and illustrated herein;

DETAILED DESCRIPTION

Telepresence systems according to the present specification include elements that provide users with an enhanced sensation that a remote second user is present in a telepresence room and/or the first user being present in a remote telepresence room. As such, embodiments described herein provide users of the telepresence system a highly interactive telepresence experience. The telepresence system includes at least a pair of telepresence rooms, which may have monitors to simulate an environment, such as a room or an outdoor space. The monitors may extend between a floor and a ceiling of the telepresence room. Within each of the rooms may be objects. For example, different furniture may be positioned in room, such as a couch and/or a bed and the furniture between the two rooms may be the same and arranged in the same manner.

To provide an enhanced sensation that more than one person is actually present in the telepresence room, the furniture or other objects in the room may be embedded with heat generating sources, with a plurality of sensors, with a plurality of actuators, and the like. The heat generating sources are configured to simulate body heat of the persons or pets that are in the other remote telepresence room. The plurality of actuators may actuate to mimic a movement of the simulated user. Further, the plurality of actuators may actuate to mimic a heart rate or breathing rate of the simulated user. The plurality of sensors may be positioned in or around the object and may determine any movement of the user to be simulated, breathing patterns, and psychological changes, such as body heat, heart rate, and emotion changes. All of these may be used to enhance a sensation that the more than one person is actually present in the telepresence room.

As used herein, the term U communicatively coupled ⬜ means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

Figure 1:
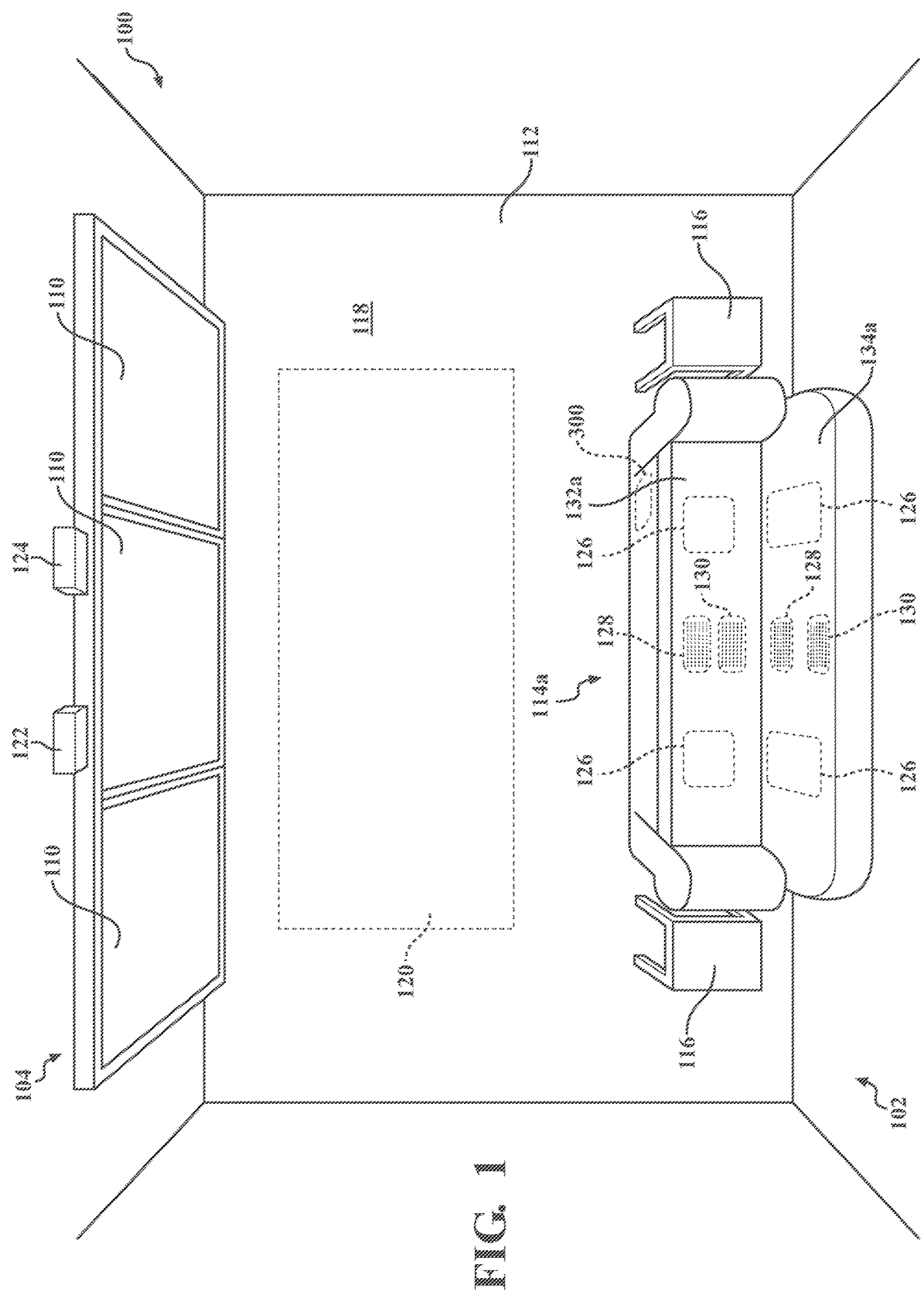
FIG. 1 schematically depicts a top view of an example telepresence room of a telepresence system according to one or more embodiments shown or described herein.
Figure 2A:
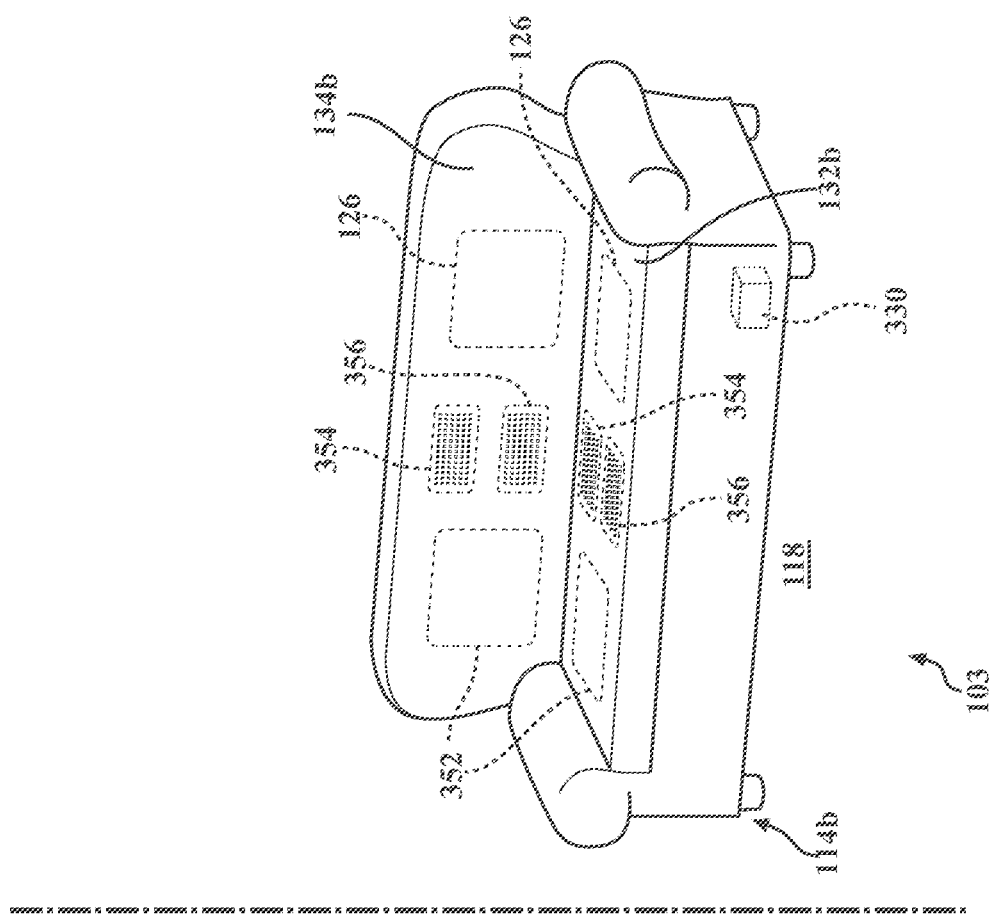
FIG. 2A schematically depicts an isolated perspective view of a sofa from the example telepresence room of FIG. 1 and a sofa from a remote telepresence room according to one or more embodiments shown and described herein.
Figure 2A:
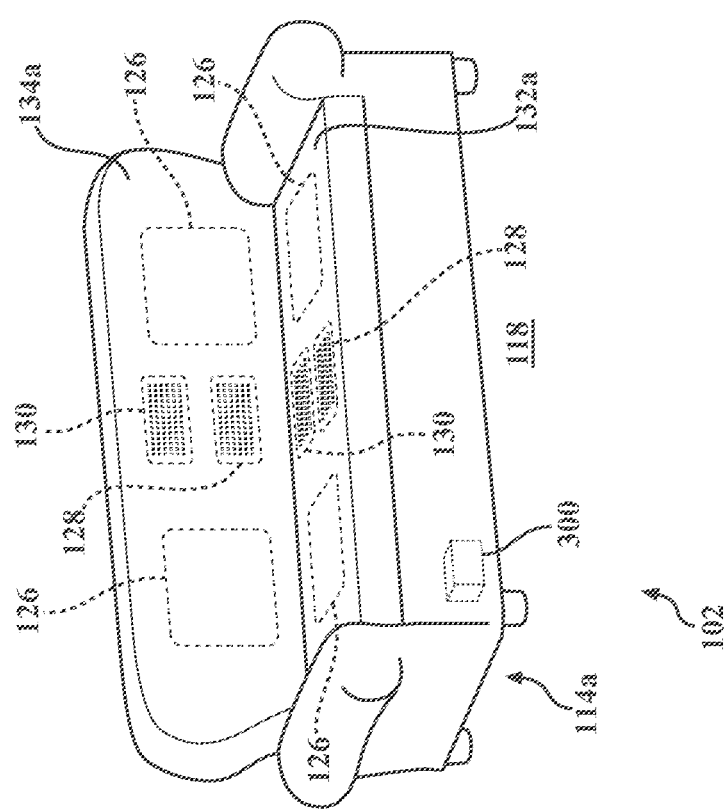
Figure 2B:
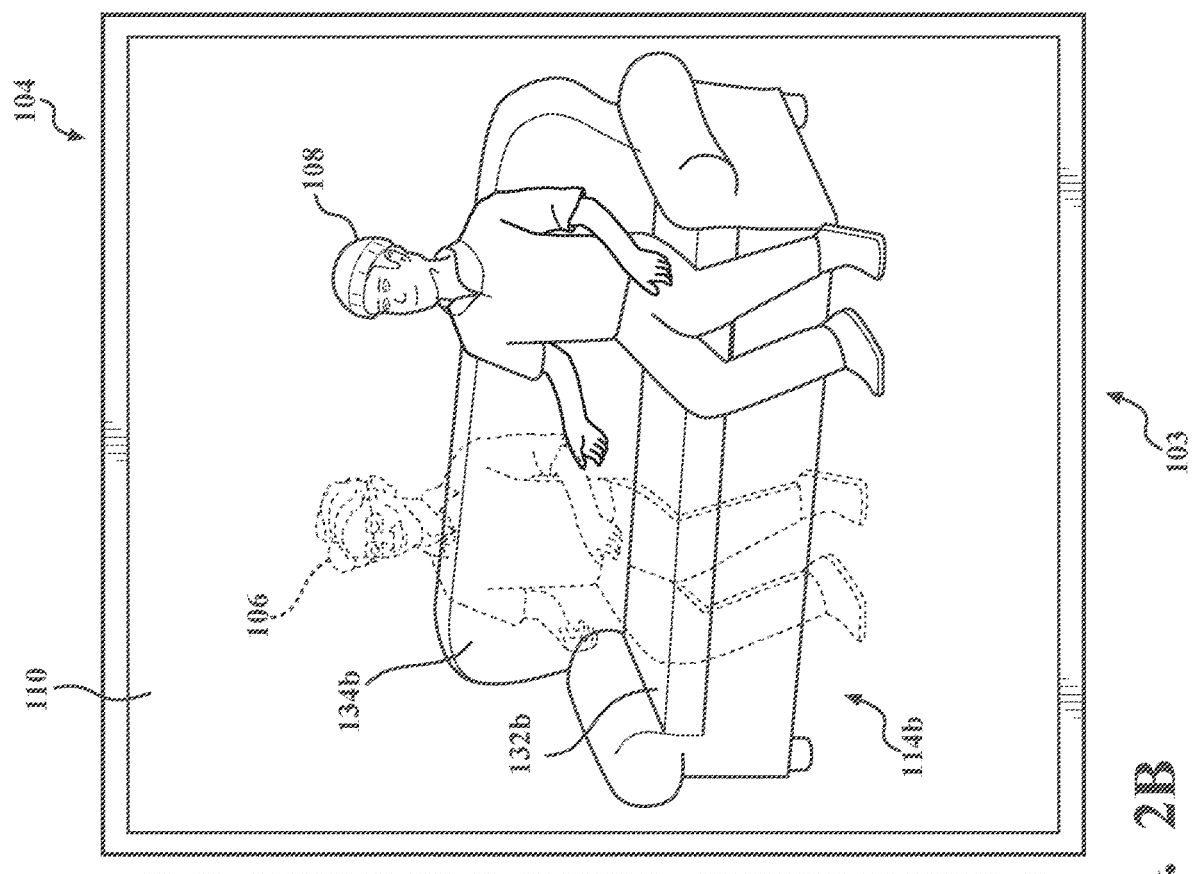
FIG. 2B schematically depicts an isolated perspective view of a first monitor positioned within the telepresence room displaying the sofa from the telepresence room of FIG. 2A with a first user positioned thereon, a simulated user from the remote telepresence room positioned next to the first user and a monitor positioned within the remote telepresence room displaying the sofa with the second user positioned thereon and a simulation of the first user positioned next to the second user according to one or more embodiments shown and described herein.
Figure 2B:
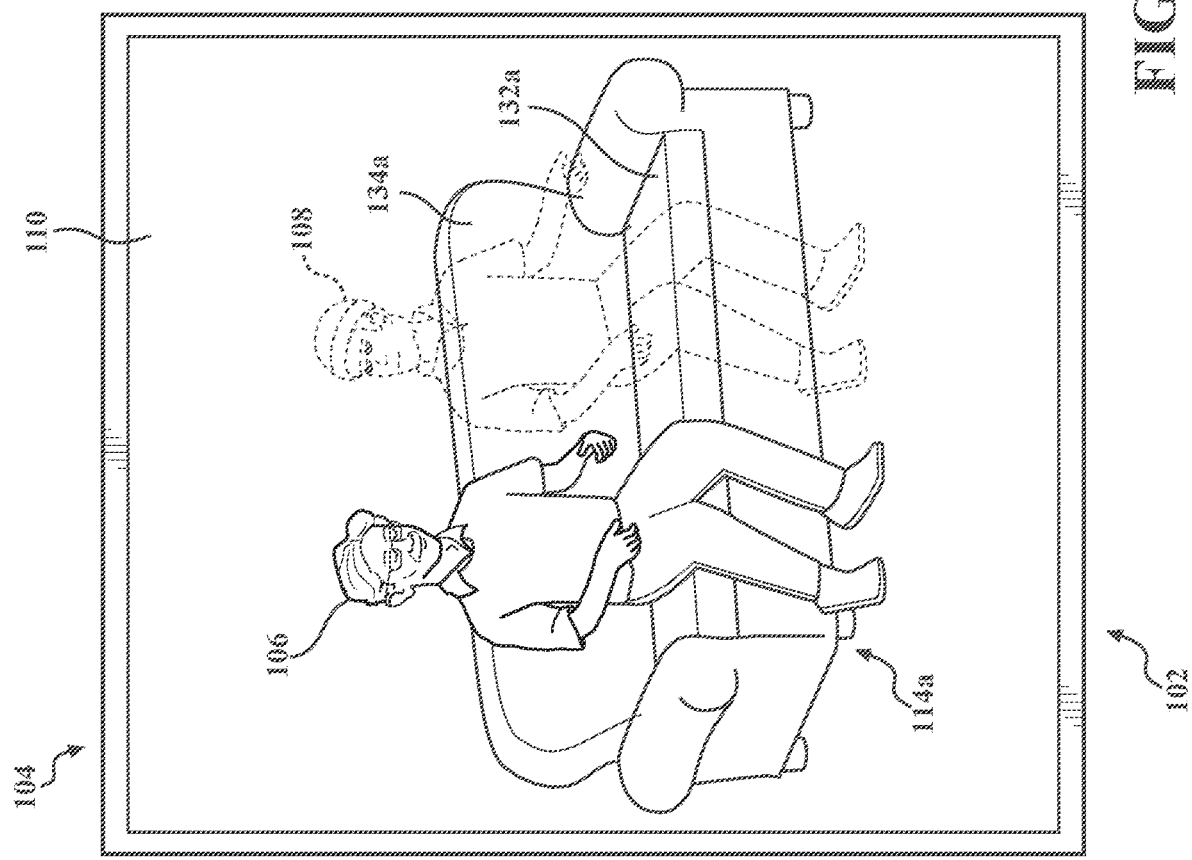

Referring now to FIGS. 1 and 2A-2B, one embodiment of an example telepresence system 100 is depicted. In the depicted embodiment, the telepresence system 100 includes an example telepresence room 102. It should be appreciated and understood that the telepresence system 100 includes at least one remote telepresence room 103 (FIG. 2B) and may include a plurality of additional remote telepresence rooms. Further, each additional telepresence room is similar to the example telepresence room 102, as described in greater detail herein. As such, for brevity reasons, only the example telepresence room 102 will be further described with reference to the telepresence system 100 of FIG. 1.

In various embodiments, the telepresence room 102 may be an immersive room that employs a plurality of monitors 104 to simulate remote users (e.g., a second user, a third user, and so on) as being located in the telepresence room 102 together. That is, a first user 106 may be positioned in the telepresence room 102 and a second user 108 may be in another telepresence room that is remote to the telepresence room 102.

Each of the plurality of monitors 104 may include a display 110. In some embodiments, the plurality of monitors 104 and display 110 may extend between a floor 112 and a ceiling. However, it should be understood that the plurality of monitors 104 and display 110 may be any size. In some embodiments, the plurality of monitors 104 may be coupled to a wall within the telepresence room 102. In other embodiments, the plurality of monitors 104 may be coupled to more than one wall. Further, in some embodiments, the plurality of monitors 104 may be coupled to be adjacent to one another. In other embodiments, the plurality of monitors 104 may be spaced a part from one another. Further, the plurality of monitors 104 may be configured to simulate an environment. Example environments may include, but are not limited to, a living room, a bedroom, an outdoor space, and the like.

The displays 110 depict images of the first user 106, the second user 108, and a plurality of other users that are participating in the telepresence room experience. In some embodiments, the depicted images are in real time. In other embodiments, the depicted images are delayed. Each display 110 of the plurality of monitors 104 may be used to simulate that the first and second users 106, 108, and any additional users, are within the same room (e.g., the telepresence room 102) such that the first and second users 106, 108 may converse as if they are in the same room and feel sensations as if they are in the same room. As best illustrated in FIG. 2B, the display 110 of the plurality of monitors 104 within the telepresence room 102 depict the first user 106 and a simulation of the second user 108 positioned within the same telepresence room 102. Further, the display 110 of the plurality of monitors 104 of the at least one remote telepresence room 103 depict the second user 108 and a simulation of the first user 106 positioned within the at least one remote telepresence room 103. As such, the telepresence system 100 described herein improves and/or enhances the sensation that more than one user is present in the telepresence room (e.g., within the telepresence room 102).

In some embodiments, the floor 112 includes a surface 118. The surface 118 may include portions that are floor displays 120. The floor displays 120 may be communicatively coupled to the plurality of monitors 104. As such, the floor displays 120 may display where the remote user (i.e., the second user 108) in the at least one remote telepresence room 103 is currently standing to simulate the second user 108 within the telepresence room 102. In some embodiments, the simulation of the second user 108 standing on the floor 112 within the telepresence room 102 may be by footprints that correspond to where the second user 108 is standing in the at least one remote telepresence room 103. Further, in some embodiments, the displayed footprints may the second user 108 leaving the at least one remote telepresence room 103 and then returning. The displayed footprints may also provide different activities, such as dancing, jumping, jogging, and the like.

It should be understood that the floor displays 120 and each display 110 of the plurality of monitors 104 depicted in FIGS. 1 and 2A-2B may be more than one monitor and more than one display. As such, images may extend or wrap between each of the plurality of monitors 104 and the associated display 110 and more than one floor display 120 to have a seamless projection of the images displayed on the multiple floor displays 120 and by the multiple displays 110 of the plurality of monitors 104.

Still referring to FIGS. 1 and 2A-2B, within the telepresence room 102 may be one or more objects 114a that the first user 106 may position them self-thereon. For example, one or more objects 114a may include furniture such as a couch, a bed, a reclining chair, an ottoman, and the like. As depicted in FIGS. 1 and 2A-2B, the one or more objects 114a of the telepresence room 102 is furniture, depicted as a couch, and an identical object 114b is depicted in the at least one remote telepresence room 103. As such, the terms [ object] and [ couch] are interchangeably used herein. Also depicted in the telepresence room 102 are additional objects that a user would not typically positioned them self on or in, such as end tables 116. Other examples include plants, artwork, lighting, and the like.

It should be appreciated that the one or more objects 114a, 114b between the telepresence room 102 and the at least one remote telepresence room 103 may be the same and may also be arranged in the same manner That is, as best depicted in FIGS. 2A-2B, each of the telepresence rooms 102, 103 include the couch 114a, 114b. The couch 114a, 114b is arranged similarly between each of the telepresence rooms 102, 103 to be displayed as best shown in FIG. 2B.

Now referring to FIGS. 2A-2B, the object 114a, depicted as a couch in the telepresence room 102, includes a first electronic control unit 300, a plurality of sensors 126, one or more heat generating devices 128, and a plurality of actuators 130, as discussed in greater detail herein. Further, the couch 114b in the at least one remote telepresence room 103 includes a second electronic control unit 330, a plurality of sensors 352, one or more heat generating devices 354, and a plurality of actuators 356, as discussed in greater detail herein. It should be understood that in objects 114a that have a seat portion 132a and a back portion 134a, the plurality of sensors 126 (352), one or more heat generating devices 128 (354), and a plurality of actuators 130 (356) may be disposed in either the seat portion 132a, the back portion 134a, and/or combination thereof. In other embodiments, in objects 114a that do not have a seat portion 132a and/or a back portion 134a, the plurality of sensors 126 (352), one or more heat generating devices 128 (354), and a plurality of actuators 130 (356) may be disposed in other areas of the object 114a (114b).

The plurality of sensors 126 may each be an input device that may include internal sensors such as an image sensor, a temperature sensor, a pressure sensor, a position sensor, a proximately sensor, and/or combinations thereof. The plurality of sensors 126 are communicatively coupled to the first electronic control unit 300 to provide input data. In some embodiments, the plurality of sensors 126 may be a deformable sensor that includes a membrane and the internal sensor is capable of detecting any movement of the deformable membrane, such as movement caused by breathing, a pulsating caused from a heart rate, and the like, as discussed in greater detail herein.

While the plurality of sensors 126 are depicted as being only one side of the couch 114a, this is non-limiting and the plurality of sensors 126 may be positioned anywhere on the couch 114a including the seat portion 132a, the back portion 134a, or anywhere else. For example, the first user 106 may sit on the left side of the couch 114a, the right side of the couch 114a, in the center of the couch 114a, and the like. As such, in any position, the plurality of sensors 126 are configured to detect any movement, breathing rate or pattern, heart rate, and the like, of the first user 106 regardless of sitting, leaning, standing positions, and the like. Further, the plurality of sensors 126 may be positioned in a random order or sequence, in some pattern, and/or the like.

In another embodiment, the plurality of sensors 126 may be provided in other objects 114a, such as a robe or a blanket. The plurality of sensors 126 may detect movement, breathing, heartrate, heat, emotions, and the like of the user within the robe or under the blanket.

Still referring to FIGS. 2A-2B, the one or more heat generating devices 128 may be an output device that, upon a command from the first electronic control unit 300, provide additional heat or air conditioning to a particular location or spot on the couch 114a. As such, the one or more heat generating devices 128 may provide a temperature change to the back portion 134a, the seat portion 132a, a combination thereof, or anywhere else on the couch 114a. While the one or more heat generating devices 128 are depicted as being only one side of the couch 114a, this is non-limiting and the one or more heat generating devices 128 may be positioned anywhere on the couch 114a including the seat portion 132a, the back portion 134a, or anywhere else.

Further, the one or more heat generating devices 128 may be positioned in a random order or sequence, in some pattern, and/or the like. As such, the one or more heat generating devices 128 are configured to simulate a temperature change based on a presence or emotion of the second user 108, a pet, and the like, that are present in the at least one remote telepresence room 103. For example, the second user 108 of the at least one remote telepresence room 103 may be sitting on a left side of the couch 114b and the one or more heat generating devices 128 on the left side of the couch 114a within the telepresence room 102 may activate to simulate body heat. As such, the first user 106 in the telepresence room 102 may be able to feel the U body heat generated by the one or more heat generating devices 128 on the left side of the couch 114a such that the presence of the second user 108 is simulated as actually being in the telepresence room 102. As another example, a pet s favorite spot on the couch 114a may be warmer to simulate the pet actually being in the favorite spot.

The plurality of actuators 130 may be an output device that, upon a command from the first electronic control unit 300 provide movement, pressure, touch, and the like, to a particular location or spot on the couch 114a. As such, the plurality of actuators 130 may provide a movement, pressure, or touch sensation on or along the back portion 134a, the seat portion 132a, a combination thereof, or anywhere else on the couch 114a. While the plurality of actuators 130 are depicted as being only one side of the couch 114a, this is non-limiting and the plurality of actuators 130 may be positioned anywhere on the couch 114a including the seat portion 132a, the back portion 134a, or anywhere else.

Further, the plurality of actuators 130 may be positioned in a random order or sequence, in some pattern, and/or the like. As such, the plurality of actuators 130 are configured to simulate a movement or sensation based on a movement or emotion of the second user 108, a pet, and the like, that are present in the at least one remote telepresence room 103. For example, the second user 108 of the at least one remote telepresence room 103 may be sitting on a left side of the couch 114b and the plurality of actuators 130 on the left side of the couch 114a within the telepresence room 102 may activate to mimic a movement of the second user 108. As such, the first user 106 in the telepresence room 102 may be able to feel the movement on the left side of the couch 114a such that the presence of the second user 108 is simulated in the telepresence room 102.

Still referring to FIGS. 2A-2B, the plurality of sensors 352 may each be an input device that may include internal sensors such as an image sensor, a temperature sensor, a pressure sensor, a position sensor, a proximately sensor, and/or combinations thereof. The plurality of sensors 352 is communicatively coupled to the second electronic control unit 330 to provide input data. In some embodiments, the plurality of sensors 352 may be a deformable sensor that includes a membrane and the internal sensor is capable of detecting any movement of the deformable membrane, such as movement caused by breathing, a pulsating caused from a heart rate, and the like, as discussed in greater detail herein.

While the plurality of sensors 352 are depicted as being only on one side of the couch 114b, this is a non-limiting example and the plurality of sensors 352 may be positioned anywhere on the couch 114b including the seat portion 132b, the back portion 134b, or anywhere else. For example, the second user 108 may sit on the left side of the couch 114b, the right side of the couch 114b, in the center of the couch 114b, and the like. As such, in any position, the plurality of sensors 352 detecting any movement, breathing rate or pattern, heart rate, and the like, of the second user 108 regardless of sitting, leaning, standing positions, and the like. Further, the plurality of sensors 352 may be positioned in a random order or sequence, in some pattern, and/or the like.

Still referring to FIGS. 2A-2B, the one or more heat generating devices 354 may be an output device that, upon a command from the second electronic control unit 330, provides additional heat or air conditioning to a particular location or spot on the couch 114b. As such, the one or more heat generating devices 354 may provide a temperature change to the back portion 134b, the seat portion 132b, a combination thereof, or anywhere else on the couch 114b. While the one or more heat generating devices 354 are depicted as being only one side of the couch 114b, this is non-limiting and the one or more heat generating devices 354 may be positioned anywhere on the couch 114b including the seat portion 132b, the back portion 134b, or anywhere else.

Further, the one or more heat generating devices 354 may be positioned in a random order or sequence, in some pattern, and/or the like. As such, the one or more heat generating devices 354 are configured to simulate a temperature change based on a presence or emotion of the first user 106, a pet, and the like, that are present in the telepresence room 102. For example, the first user 106 of the telepresence room 102 may be sitting on a left side of the couch 114a and the one or more heat generating devices 354 on the left side of the couch 114b within the at least one remote telepresence room 103 may activate to simulate body heat. As such, the second user 108 in the at least one remote telepresence room 103 may be able to feel the body heat of the simulated first user 106 on the left side of the couch 114b such that the presence of the first user 106 is simulated in the at least one remote telepresence room 103. As another example, a pet's favorite spot on the couch 114b may be warmer to simulate the pet actually being in the favorite spot.

In other embodiments, the object 114b may be a robe, a blanket, and the like. As such, the one or more heat generating devices 354 may be provided in the robe, the blanket, and the like to simulate heat.

Still referring to FIGS. 2A-2B, the plurality of actuators 356 may be an output device that, upon a command from the second electronic control unit 330, provide movement, pressure, touch, and the like, to a particular location or spot on the couch 114b. As such, the plurality of actuators 356 may provide a movement, pressure, or touch sensation on or along the back portion 134b, the seat portion 132b, a combination thereof, or anywhere else on the couch 114b. While the plurality of actuators 356 are depicted as being only one side of the couch 114b, this is non-limiting and the plurality of actuators 356 may be positioned anywhere on the couch 114b including the seat portion 132b, the back portion 134b, or anywhere else.

Further, the plurality of actuators 356 may be positioned in a random order or sequence, in some pattern, and/or the like. As such, the plurality of actuators 356 are configured to simulate a movement or sensation based on a movement or emotion of the first user 106, a pet, and the like, that are present in the telepresence room 102. For example, the first user 106 of the telepresence room 102 may be sitting on a left side of the couch 114a and the plurality of actuators 356 on the left side of the couch 114b within the at least one remote telepresence room 103 may activate to a movement of the first user 106. As such, the second user 108 in the at least one remote telepresence room 103 may be able to feel the movement on the left side of the couch 114b such that the presence of the first user 106 is further simulated in the at least one remote telepresence room 103.

In other embodiments, the object 114b may be a robe, a blanket, and the like. As such, the plurality of actuators 356 may be provided in the robe, the blanket, and the like to provide pressure, such as simulating a person sitting on user's lap, squeezing the user's shoulder, nudging the user, and the like.

Referring back to FIGS. 1 and 2A-2B, the telepresence room 102 may further include an image capturing device 122 and/or a thermal image capturing device 124. The image capturing device 122 is communicatively coupled to the first electronic control unit 300. The image capturing device 122 may capture a plurality of images including live or streaming feeds in real time. The image capturing device 122 may be positioned within the telepresence room to capture any objects, users, and/or other articles positioned or disposed within the telepresence room 102. It should be appreciated that there may be a plurality of image capturing devices disposed with the telepresence room 102 and communicatively coupled to the first electronic control unit 300.

The thermal image capturing device 124 may be communicatively coupled to the first electronic control unit 300. The thermal image capturing device 124 may capture a plurality of heat signatures, heat properties, heat patterns, images, and the like, including live or streaming feeds in real time. The thermal image capturing device 124 may be positioned within the telepresence room to capture any objects, users, and/or other articles positioned or disposed within the telepresence room 102. It should be appreciated that there may be a plurality of thermal image capturing devices disposed with the telepresence room 102 and communicatively coupled to the first electronic control unit 300.

Figure 3A:
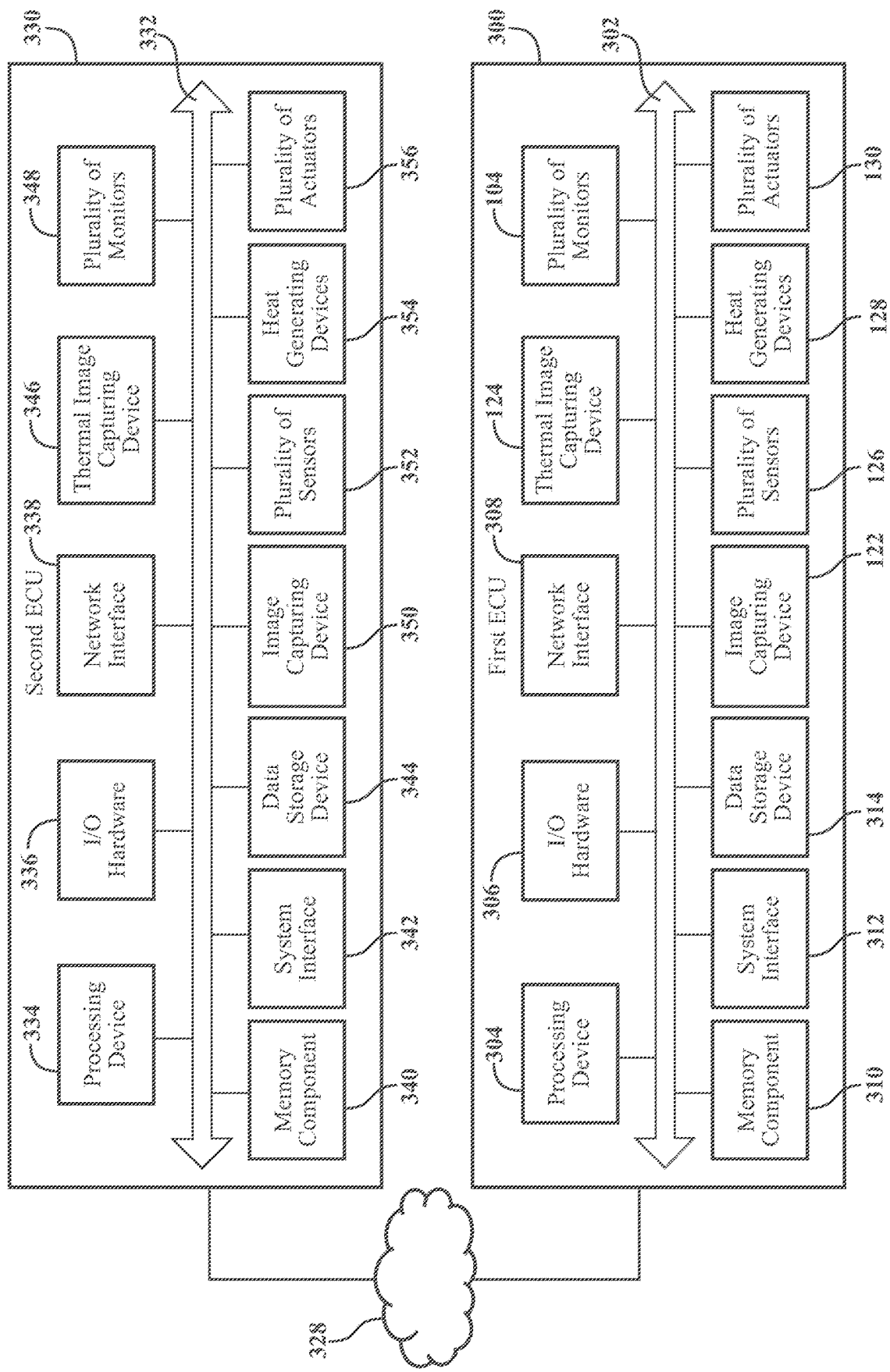
FIG. 3A schematically depicts components of an example first electronic control unit of the example telepresence room and components of an example second electronic control unit of the example remote telepresence room according to one or more embodiments described and illustrated herein.

FIG. 3A depicts various illustrative internal components of the first electronic control unit 300 and internal components of the second electronic control unit 330. More specifically, the first electronic control unit 300 may be communicatively coupled to the second electronic control unit 330 via a network 328. The network 328 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connect and/or communicatively couple the first electronic control unit 300 and the second electronic control unit 330 together.

Still referring to FIG. 3A, the first electronic control unit 300 is a non-transitory computer-readable medium that stores computer-readable programming instructions for completing the various processes described herein, embodied as hardware, software, and/or firmware, according to embodiments shown and described herein. While in some embodiments the first electronic control unit 300 may be configured as a general purpose computer with the requisite hardware, software, and/or firmware, in other embodiments, the first electronic control unit 300 may also be configured as a special purpose computer designed specifically for performing the functionality described herein. For example, the first electronic control unit 300 may be a device that is particularly adapted provide a sensation that more than one person is present in a telepresence room by providing a customizable plurality of options such as generating a heat to mimic or simulate specific emotions or breathing rates and/or patterns and actuating a plurality of actuators to mimic a heat rate, a movement, and the like of the simulated person within the telepresence room. In embodiments where the first electronic control unit 300 is a general purpose computer, the systems and methods described herein provide a mechanism for enhancing a sensation that more than one person is present in a telepresence room by providing a customizable plurality of options such as generating a heat to mimic or simulate specific emotions or breathing rates and/or patterns and actuating a plurality of actuators to mimic a heat rate, a movement, and the like of the simulated person within the telepresence room.

Still referring to FIG. 3A, the first electronic control unit 300 may generally be a computing system positioned within the telepresence room. In some embodiments, the first electronic control unit 300 may be disposed within the object 114a (FIG. 1), such as within the example couch. In some embodiments, the first electronic control unit 300 may be a plurality of computing systems. As also illustrated in FIG. 3A, the first electronic control unit 300 may include a processor 304, an I/O hardware 306, a network interface hardware 308, a non-transitory memory component 310, a system interface 312, and a data storage device 314. Further, the first electronic control unit 300 may be communicatively coupled to the plurality of sensors 126, the thermal image capturing device 124, the image capturing device 122, the plurality of monitors 104, the one or more heat generating devices 128, and the plurality of actuators 130 to receive a plurality of data as inputs and control outputs to/from each of these components. A local interface 302, such as a bus or the like, may interconnect the various components.

It should be understood that the local interface 302 may be formed from any medium that is capable of transmitting a signal such as, for example, conductive wires, conductive traces, optical waveguides, or the like. In some embodiments, the local interface 302 may facilitate the transmission of wireless signals, such as Wi-Fi, Bluetooth, Near Field Communication (NFC) and the like. Further, it should be appreciated that the local interface 302 may communicatively couple the second electronic control unit 330 to the first electronic control unit 300. Moreover, the local interface 302 may be formed from a combination of mediums capable of transmitting signals. In one embodiment, the local interface 302 includes a combination of conductive traces, conductive wires, connectors, and buses that cooperate to permit the transmission of electrical data signals to components such as processors, memories, sensors, input devices, output devices, and user interfaces. Accordingly, the local interface 302 may include a bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The processor 304, such as a computer processing unit (CPU), may be the central processing unit of the first electronic control unit 300, performing calculations and logic operations to execute a program. The processor 304, alone or in conjunction with the other components, is an illustrative processing device, computing device, processor, or combination thereof. The processor 304 may include any processing component configured to receive and execute instructions (such as from the data storage device 314 and/or the memory component 310).

The memory component 310 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 310 may include one or more programming instructions thereon that, when executed by the processor 304, cause the processor 304 to complete various processes, such as the processes described herein with respect to FIGS. 4-5. Still referring to FIG. 3A, the programming instructions stored on the memory component 310 may be embodied as a plurality of software logic modules, where each logic module provides programming instructions for completing one or more tasks, as described in greater detail below with respect to FIG. 3B.

The network interface hardware 308 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 308 may provide a communications link between the first electronic control unit 300, the second electronic control unit 330, the plurality of monitors 104, the thermal and/or image capturing devices 122, 124, the plurality of sensors 126, and the other components of a network such as a network 328, satellites, user computing devices, server computing devices, and the like. That is, in embodiments, the network interface hardware 308 is configured to receive signals from the network 328 and includes one or more conductive elements that interact with electromagnetic signals transmitted by the network 328. The received signal is transformed into a data signal indicative of the command from the second electronic control unit 330, such as movements of the second user 108 (FIG. 2B), breathing rates and/or patterns of the second user 108 (FIG. 2B), heart rates of the second user 108 (FIG. 2B), emotions of the second user 108 (FIG. 2B), and the like, that may be gathered, sensed, determined, and the like from the second user 108 (FIG. 2B) within the at least one remote telepresence room 103 (FIG. 2B) that are used in the simulation of the second user 108 (FIG. 2B) in the telepresence room 102 (FIG. 1).

Still referring to FIG. 3A, the data storage device 314, which may generally be a storage medium, may contain one or more data repositories for storing data that is received and/or generated. The data storage device 314 may be any physical storage medium, including, but not limited to, a hard disk drive (HDD), memory, removable storage, and/or the like. While the data storage device 314 is depicted as a local device, it should be understood that the data storage device 314 may be a remote storage device, such as, for example, a server computing device or the like. Illustrative data that may be contained within the data storage device 314 is described below with respect to FIG. 3C.

Still referring to FIG. 3A, the I/O hardware 306 may communicate information between the local interface 302 and one or more other components of the telepresence system 100. For example, the I/O hardware 306 may act as an interface between the first electronic control unit 300 and other components, such as the plurality of sensors 126, the thermal and image capturing devices 122, 124, the plurality of actuators 130, the one or more heat generating devices 128, the plurality of monitors 104, and/or the like. In some embodiments, the I/O hardware 306 may be utilized to transmit one or more commands to the other components of the telepresence system 100.

The system interface 312 may generally provide the first electronic control unit 300 with an ability to interface with one or more external devices such as, for example, the second electronic control unit 330, such that the first electronic control unit 300 may receive information and/or data from the second electronic control unit 330 and/or such that the first electronic control unit 300 may transmit information and/or data to the second electronic control unit 330. Further, the first electronic control unit 300 may push a notification or alert to the plurality of monitors 104 to alert the first user 106 (FIG. 2B) of a presence of the second user 108 (FIG. 2B) and the like. As such, the system interface 312 permits bidirectional communication between the first electronic control unit 300 and the second electronic control unit 330. Communication with external devices may occur using various communication ports (not shown). An illustrative communication port may be attached to a communications network.

Still referring to FIG. 3A, the plurality of sensors 126 may be communicatively coupled to the local interface 302 and communicatively coupled to the processor 304 via the local interface 302. The plurality of sensors 126 may be any sensing device, sensor, or detector that is suitable for obtaining or collecting data. Any suitable commercially available sensors may be used for the plurality of sensors 126 without departing from the scope of the present disclosure. In some embodiments, the plurality of sensors 126 may be coupled to one or more other components that provide additional functionality for sensing, such as, for example, an image capturing device that captures images, whether still or video (a sequence of dynamic photos). In some embodiments, the plurality of sensors 126 may employ an input device having a body and a deformable membrane that is attached to the body. The deformable membrane and the body define an enclosure that is filled with a medium. An internal sensor detects a location of one or more indentions in the deformable membrane caused by a user, such as by the body, movement, breathing patterns and/or rates, or an object pressed into the deformable membrane. Indentions in different locations may be used as different inputs. Thus, the input device can be programmed to have □ buttons□ at any location on its surface. Further, various gestures can be used as inputs, such as sliding a finger in a motion on the deformable membrane. Many other applications for the input devices described herein are possible. Additional information regarding the plurality of sensors 126 with a deformable membrane is provided in U.S. patent application Ser. No. 17/159,699 entitled □ INPUT DEVICES HAVING A DEFORMABLE MEMBRANE AND METHODS OF USING THE SAME□, which is hereby incorporated by reference in its entirety.

The image capturing device 122 may be communicatively coupled to the local interface 302 and coupled to the processor 304 via the local interface 302. The image capturing device 122 may be any imaging device, sensor, or detector that is suitable for obtaining images. As used herein, the term □ images□ or □ image□ refers to video images (i.e., a sequence of consecutive images), still images (including still images isolated from video images), and/or image data. Any suitable commercially available image capturing device 122 may be used without departing from the scope of the present disclosure. In some embodiments, the image capturing device 122 may be coupled to one or more other components that provide additional functionality for imaging, such as, for example, one or more sensors.

The image capturing device 122 may include or may be coupled to a lens (not shown). The lens is not limited by this disclosure and may generally be any optical component that is configured to focus the light entering the image capturing device 122 such that an image can be properly obtained. In some embodiments, the lens may be a fixed lens that is not adjustable. In other embodiments, the lens may be adjustable, either manually or automatically by the processor 304, to zoom in on an object, zoom out on an object, and/or adjust the focus of the light entering the image capturing device 122.

The thermal image capturing device 124 may be communicatively coupled to the local interface 302 and coupled to the processor 304 via the local interface 302. The thermal image capturing device 124 may be any thermal imaging device, sensor, or detector that is suitable for obtaining thermal images based on a heat. Any suitable commercially available thermal image capturing device 124 may be used without departing from the scope of the present disclosure. In some embodiments, the thermal image capturing device 124 may be coupled to one or more other components that provide additional functionality for imaging, such as, for example, one or more sensors.

The thermal image capturing device 124 may include or may be coupled to a lens, filter, and the like (not shown). The lens is not limited by this disclosure and may generally be any component that is configured to filter light, capture thermal properties, and the like such that the thermal image capturing device 124 may properly obtain heat properties of a user, an animal, such as a pet, and the like. In some embodiments, the lens or filter may be fixed and is not adjustable. In other embodiments, the lens or filter may be adjustable, either manually or automatically by the processor 304, to zoom in on an object, zoom out on an object, and/or adjust the focus of the thermal image capturing device 124.

The one or more heat generating devices 128 may be communicatively coupled to the local interface 302 and coupled to the processor 304 via the local interface 302. The one or more heat generating devices 128 may be any heating element that is suitable of generating heat, such as an elongated strip of material that functions as a resistor. Any suitable commercially available heat generation device may be used without departing from the scope of the present disclosure. In some embodiments, the one or more heat generating devices 128 may be coupled to one or more other components that provide additional functionality for generating heat, such as, for example, one or more sensors.

The plurality of monitors 104 may be communicatively coupled to the local interface 302 and coupled to the processor 304 via the local interface 302. The plurality of monitors 104 may be any monitor that is suitable for displaying images, such as images of the first user 106 (FIG. 2B) and simulated images of the second user 108 (FIG. 2B). Any suitable commercially available monitor may be used without departing from the scope of the present disclosure. In some embodiments, the plurality of monitors 104 may be coupled to one or more other components that provide additional functionality for displaying images or the first and second user and movements thereof, such as, for example, the image capturing device 122 (FIG. 1), the thermal image capturing device 124 (FIG. 1) and one or more sensors.

The plurality of actuators 130 may be communicatively coupled to the local interface 302 and coupled to the processor 304 via the local interface 302. The plurality of actuators 130 may be any device that is suitable for simulating a movement or an emotion, such as a varying degree of squeezing or touching of the first user 106 (FIG. 2B) to simulate the second user 108 (FIG. 2B) hugging the first user 106 (FIG. 2B) or moving on the object. Any suitable commercially available actuator device may be used without departing from the scope of the present disclosure. In some embodiments, the plurality of actuators 130 may be coupled to one or more other components that provide additional functionality for simulating movements of the first and second user, such as, for example, the image capturing device 122, the thermal image capturing device 124 and one or more sensors.

Still referring to FIG. 3A, the second electronic control unit 330 is a non-transitory computer-readable medium that stores computer-readable programming instructions for completing the various processes described herein, embodied as hardware, software, and/or firmware, according to embodiments shown and described herein. While in some embodiments the second electronic control unit 330 may be configured as a general purpose computer with the requisite hardware, software, and/or firmware, in other embodiments, the second electronic control unit 330 may also be configured as a special purpose computer designed specifically for performing the functionality described herein. For example, the second electronic control unit 330 may be a device that is particularly adapted to provide a sensation that more than one person is present in a telepresence room by providing a customizable plurality of options such as generating a heat to mimic or simulate specific emotions or breathing rates and/or patterns and actuating a plurality of actuators to mimic a heat rate, a movement, and the like of the simulated person within the telepresence room. In embodiments where the second electronic control unit 330 is a general purpose computer, the systems and methods described herein provide a mechanism for enhancing a sensation that more than one person is present in a telepresence room by providing a customizable plurality of options such as generating a heat to mimic or simulate specific emotions or breathing and actuating a plurality of actuators to mimic a heat rate, a movement, and the like of the simulated person within the telepresence room.

Still referring to FIG. 3A, the second electronic control unit 330 may generally be a computing system positioned within the remote telepresence room. It should be understood that the second electronic control unit 330 is identical to the first electronic control unit 300 in operation and inputs. Further, the components of each telepresence room operate and transmit/receive data in similar fashions. As such, the telepresence room 102 (FIG. 1) of the telepresence system 100 is a similar to the at least one remote telepresence room 103 (FIG. 2A) and components thereof. For brevity reasons, the at least one remote telepresence room 103 (FIG. 2A) and additional rooms and components thereafter are not illustrated again.

In some embodiments, the second electronic control unit 330 may be disposed within the object 114*b* (FIG. 2B), such as within the example couch. In some embodiments, the second electronic control unit 330 may be a plurality of computing systems. As also illustrated in FIG. 3A, the second electronic control unit 330 may include a processor 334, an I/O hardware 336, a network interface hardware 338, a non-transitory memory component 340, a system interface 342, and a data storage device 344. Further, the second electronic control unit 330 may be communicatively coupled to the plurality of sensors 352, the thermal image capturing device 346, the image capturing device 350, the plurality of monitors 348, the heat generating devices 354, and the plurality of actuators 356 to receive a plurality of data as inputs and control outputs to/from each of these components. A local interface 332, such as a bus or the like, may interconnect the various components.

It should be understood that the local interface 332 may be formed from any medium that is capable of transmitting a signal such as, for example, conductive wires, conductive traces, optical waveguides, or the like. In some embodiments, the local interface 302 may facilitate the transmission of wireless signals, such as Wi-Fi, Bluetooth, Near Field Communication (NFC) and the like. Further, it should be appreciated that the local interface 332 may communicatively couple second electronic control unit 330 to second electronic control unit 330. Moreover, the local interface 332 may be formed from a combination of mediums capable of transmitting signals. In one embodiment, the local interface 332 includes a combination of conductive traces, conductive wires, connectors, and buses that cooperate to permit the transmission of electrical data signals to components such as processors, memories, sensors, input devices, output devices, and user interfaces. Accordingly, the local interface 332 may include a bus, such as for example a LIN bus, a CAN bus, a VAN bus, and the like. Additionally, it is noted that the term ⬚ signal⬚ means a waveform (e.g., electrical, optical, magnetic, mechanical or electromagnetic), such as DC, AC, sinusoidal-wave, triangular-wave, square-wave, vibration, and the like, capable of traveling through a medium.

The processor 334, such as a computer processing unit (CPU), may be the central processing unit of the second electronic control unit 330, performing calculations and logic operations to execute a program. The processor 334, alone or in conjunction with the other components, is an illustrative processing device, computing device, processor, or combination thereof. The processor 334 may include any processing component configured to receive and execute instructions (such as from the data storage device 344 and/or the memory component 340).

The memory component 340 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 340 may include one or more programming instructions thereon that, when executed by the processor 334, cause the processor 334 to complete various processes, such as the processes described herein with respect to FIGS. 4-5. Still referring to FIG. 3A, the programming instructions stored on the memory component 340 may be embodied as a plurality of software logic modules, where each logic module provides programming instructions for completing one or more tasks, as described in greater detail below with respect to FIG. 3D.

The network interface hardware 338 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 338 may provide a communications link between the first electronic control unit 300, the second electronic control unit 330, the plurality of monitors 348, the thermal and/or image capturing devices 346, 350, and the other components of a network such as a network 328, satellites, user computing devices, server computing devices, and the like. That is, in embodiments, the network interface hardware 338 is configured to receive signals from the network 328 and includes one or more conductive elements that interact with electromagnetic signals transmitted by the network 328. The received signal is transformed into a data signal indicative of the command or data from the first electronic control unit 300, such as movements of the first user 106 (FIG. 2B), breathing rates and/or patterns of the first user 106 (FIG. 2B), heart rates of the first user 106 (FIG. 2B), emotions of the first user 106 (FIG. 2B), and the like, that may be gathered, sensed, determined, and the like from the first user 106 (FIG. 2B) within the telepresence room 102 (FIG. 1) and that are used in the simulation of the first user 106 (FIG. 2B) in the at least one remote telepresence room 103 (FIG. 2B).

Still referring to FIG. 3A, the data storage device 344, which may generally be a storage medium, may contain one or more data repositories for storing data that is received and/or generated. The data storage device 344 may be any physical storage medium, including, but not limited to, a hard disk drive (HDD), memory, removable storage, and/or the like. While the data storage device 344 is depicted as a local device, it should be understood that the data storage device 344 may be a remote storage device, such as, for example, a server computing device or the like. Illustrative data that may be contained within the data storage device 344 is described below with respect to FIG. 3E.

Still referring to FIG. 3A, the I/O hardware 336 may communicate information between the local interface 332 and one or more other components of the telepresence system 100. For example, the I/O hardware 336 may act as an interface between the second electronic control unit 330 and other components, such as the plurality of sensors 352, the thermal and image capturing devices 346, 350 the plurality of actuators 356, the heat generating devices 354, the plurality of monitors 348, and/or the like. In some embodiments, the I/O hardware 336 may be utilized to transmit one or more commands to the other components of the telepresence system 100.

The system interface 342 may generally provide the second electronic control unit 330 with an ability to interface with one or more external devices such as, for example, the first electronic control unit 300, such that the second electronic control unit 330 may receive information and/or data from the first electronic control unit 300. Further, the second electronic control unit 330 may transmit information and/or data to the first electronic control unit 300. The system interface 342 may push a notification or alert to the plurality of monitors 348 to alert the second user 108 (FIG. 2B) of a presence of the first user 106 (FIG. 2B) and the like. As such, the system interface 342 permits bidirectional communication between the first electronic control unit 300 and the second electronic control unit 330. Communication with external devices may occur using various communication ports (not shown). An illustrative communication port may be attached to a communications network.

Still referring to FIG. 3A, the plurality of sensors 352 may be communicatively coupled to the local interface 332 and communicatively coupled to the processor 334 via the local interface 332. The plurality of sensors 352 may be any sensing device, sensor, or detector that is suitable for obtaining or collecting data. Any suitable commercially available sensors may be used for the plurality of sensors 352 without departing from the scope of the present disclosure. In some embodiments, the plurality of sensors 352 may be coupled to one or more other components that provide additional functionality for sensing, such as, for example, an image capturing device that captures images, whether still or video (a sequence of dynamic photos). In some embodiments, the plurality of sensors 352 may employ an input device having a body and a deformable membrane that is attached to the body. The deformable membrane and the body define an enclosure that is filled with a medium. An internal sensor detects a location of one or more indentions in the deformable membrane caused by a user, such as by the body, movement, breathing rates and/or patterns, or an object pressed into the deformable membrane. Indentions in different locations may be used as different inputs. Thus, the input device can be programmed to have "buttons" at any location on its surface. Further, various gestures can be used as inputs, such as sliding a finger in a motion on the deformable membrane. Many other applications for the input devices described herein are possible. Additional information regarding the plurality of sensors 126 with a deformable membrane is provided in U.S. patent application Ser. No. 17/159,699 entitled "INPUT DEVICES HAVING A DEFORMABLE MEMBRANE AND METHODS OF USING THE SAME", which is hereby incorporated by reference in its entirety.

The image capturing device 350 may be communicatively coupled to the local interface 332 and coupled to the processor 334 via the local interface 332. The image capturing device 350 may be any imaging device, sensor, or detector that is suitable for obtaining images. As used herein, the term [ images[ or [ image] refers to video images (i.e., a sequence of consecutive images), still images (including still images isolated from video images), and/or image data. Any suitable commercially available image capturing device 350 may be used without departing from the scope of the present disclosure. In some embodiments, the image capturing device 350 may be coupled to one or more other components that provide additional functionality for imaging, such as, for example, one or more sensors. It should be appreciated that the image capturing device 350 may be a plurality of image capturing devices communicatively coupled to the local interface 332 and coupled to the processor 334 via the local interface 332.

The image capturing device 350 may include or may be coupled to a lens (not shown). The lens is not limited by this disclosure and may generally be any optical component that is configured to focus the light entering the image capturing device 350 such that an image can be properly obtained. In some embodiments, the lens may be a fixed lens that is not adjustable. In other embodiments, the lens may be adjustable, either manually or automatically by the processor 334, to zoom in on an object, zoom out on an object, and/or adjust the focus of the light entering the image capturing device 350.

The thermal image capturing device 346 may be communicatively coupled to the local interface 332 and coupled to the processor 334 via the local interface 332. The thermal image capturing device 346 may be any thermal imaging device, sensor, or detector that is suitable for obtaining thermal images based on a heat. Any suitable commercially available thermal image capturing device 346 may be used without departing from the scope of the present disclosure. In some embodiments, the thermal image capturing device 346 may be coupled to one or more other components that provide additional functionality for imaging, such as, for example, one or more sensors. It should be appreciated that the thermal image capturing device 346 may be a plurality of image capturing devices communicatively coupled to the local interface 332 and coupled to the processor 334 via the local interface 332.

The thermal image capturing device 346 may include or may be coupled to a lens, filter, and the like (not shown). The lens is not limited by this disclosure and may generally be any component that is configured to filter light, capture thermal properties, and the like such that the thermal image capturing device 346 may properly obtain heat properties of a user, an animal, such as a pet, and the like. In some embodiments, the lens or filter may be fixed and is not adjustable. In other embodiments, the lens or filter may be adjustable, either manually or automatically by the processor 334, to zoom in on an object, zoom out on an object, and/or adjust the focus of the thermal image capturing device 346.

The one or more heat generating devices 354 may be communicatively coupled to the local interface 332 and coupled to the processor 334 via the local interface 332. The one or more heat generating devices 354 may be any heating element that is suitable of generating heat, such as an elongated strip of material that functions as a resistor. Any suitable commercially available heat generation device may be used without departing from the scope of the present disclosure. In some embodiments, the one or more heat generating devices 354 may be coupled to one or more other components that provide additional functionality for generating heat, such as, for example, one or more sensors.

The plurality of monitors 348 may be communicatively coupled to the local interface 332 and coupled to the processor 334 via the local interface 332. The plurality of monitors 348 may be any monitor that is suitable for displaying images, such as images of the first user and simulated of the second user. Any suitable commercially available monitor may be used without departing from the scope of the present disclosure. In some embodiments, the plurality of monitors 348 may be coupled to one or more other components that provide additional functionality for displaying images or the first and second user and movements thereof, such as, for example, the image capturing device 350, the thermal image capturing device 346 and one or more sensors.

The plurality of actuators 356 may be communicatively coupled to the local interface 332 and coupled to the processor 334 via the local interface 332. The plurality of actuators 356 may be any device that is suitable for simulating a movement or an emotion, such as a varying degree of squeezing or touching of the second user 108 (FIG. 2B) to simulate the first user 106 (FIG. 2B) hugging the second user 108 (FIG. 2B) or moving on the object 114b (FIG. 2B). Any suitable commercially available actuator device may be used without departing from the scope of the present disclosure. In some embodiments, the plurality of actuators 356 may be coupled to one or more other components that provide additional functionality for simulating movements of the first and second user, such as, for example, the image capturing device 122 (FIG. 1), the thermal image capturing device 124 (FIG. 1) and one or more sensors.

With reference to FIG. 3B, in some embodiments, the program instructions contained on the memory component 310 may be embodied as a plurality of software modules, where each module provides programming instructions, machine readable and executable instructions, and/or the like, for completing one or more tasks. The programming instructions, machine readable and executable instructions, and the like may comprise logic or algorithm(s) written in any programming language of any generation (e.g., 1GL, 2GL, 3GL, 4GL, or 5GL) such as, for example, machine language that may be directly executed by the processor 304, or assembly language, object-oriented programming (OOP), scripting languages, microcode, and the like, that may be compiled or assembled into machine readable and executable instructions and stored on the one or more memory component 310. Alternatively, the programming instructions, machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

For example, FIG. 3B schematically depicts the memory component 310 containing illustrative logic components according to one or more embodiments shown and described herein. As shown in FIG. 3B, the memory component 310 may be configured to store various processing logic, such as, for example, an operating logic 316, a movement logic 318, an image capturing logic 319, a heat generate logic 320, an actuate logic 322, an emotion logic 324, and a simulation logic 326 (each of which may be embodied as a computer program, firmware, or hardware, as an example).

Still referring to FIG. 3B, the operating logic 316 may include an operating system and/or other software for managing components of the first electronic control unit 300 (FIG. 3A). Further, the operating logic 316 may contain one or more software modules for monitoring data, transmitting data, and/or analyzing data. The movement logic 318 may contain one or more software modules and/or other software for managing components that are communicatively coupled to the first electronic control unit 300 (FIG. 3A). Further, the movement logic 318 may contain one or more software modules for monitoring data, transmitting data, analyzing data, collecting data and/or determining a position of the first user 106 (FIG. 2B) within the telepresence room 102 (FIG. 1) and/or whether a movement has occurred. For example, the movement logic 318 may determine whether the first user 106 (FIG. 2B) is present in the telepresence room 102 (FIG. 1), whether and where the first user 106 (FIG. 2B) is positioned on the object 114a (FIG. 1), whether the first user 106 (FIG. 2B) is walking around within the telepresence room 102 (FIG. 1), and the like. Additionally, the movement logic 318 may determine a breathing rate and/or pattern of the first user 106 (FIG. 2B), a heart rate of the first user 106 (FIG. 2B), a temperature of the first user 106 (FIG. 2B), and the like. The movement logic 318 may collect data from one or more sources (e.g. the plurality of sensors 126, the image capturing device 122 and the thermal image capturing device 124 depicted in FIG. 1, and/or the like), as described in greater detail herein.

The image capturing logic 319 may contain one or more software modules for receiving data, monitoring data, transmitting data, and/or analyzing data to provide to the plurality of monitors 104 (FIG. 1) for display and other components (e.g., the second electronic control unit 330) with the plurality of images. The image capturing logic 319 may be initiated when the first user 106 (FIG. 2B) is detected as being present in the telepresence room 102. As such, the image capturing logic 319 may assist in activating the image capturing device 122 (FIG. 1), the thermal image capturing device 124 (FIG. 1), the plurality of sensors 126 (FIG. 1), and the like.

The heat generate logic 320 may contain one or more software modules for receiving data, monitoring data, transmitting data, and/or analyzing data to provide the object and the first user 106 (FIG. 2B) with heat based on predetermined factors that are obtained by communication with the second electronic control unit 330 (FIG. 3A). The predetermined factors may include, without limitation, movements of the second user 108 (FIG. 2B), positioning of the second user 108 (FIG. 2B), determined emotions of the second user 108 (FIG. 2B), and the like. For example, a determined happy or excited emotion of the second user 108 (FIG. 2B) may be simulated by increased heat directed to the first user 106 (FIG. 2B). As such, the heat generating logic 320 may increase a heat produced by the one or more heat generating devices 128 (FIG. 1). Further, the increase may between a plurality of different temperature ranges and/or intervals that may be incrementally increased based on thresholds or may be two different settings such as between a [ high] setting and a [ normal] setting.

The actuate logic 322 may contain one or more software modules for receiving data, monitoring data, transmitting data, and/or analyzing data to provide the object and the first user with a simulated movement or touch based on predetermined factors that are obtained by communication with the second electronic control unit 330 (FIG. 3A). The predetermined factors may include, without limitation, movements of the second user 108 (FIG. 2B), positioning of the second user 108 (FIG. 2B), determined emotions of the second user 108 (FIG. 2B), and the like. For example, a determined happy or excited emotion of the second user 108 (FIG. 2B) may be simulated by an actuation of one or more actuators of the plurality of actuators 130 (FIG. 1) to simulate a touch, a hug, and the like of the second user 108 (FIG. 2B) upon the first user 106 (FIG. 2B). As such, the actuate logic 322 may actuate one or more actuators of the plurality of actuators 130 between a plurality of different movement and pressure ranges and/or intervals that may be incrementally increased based on thresholds or may be two different settings such as between a [ high[ setting and a [ normal [ setting.

The emotion logic 324 may contain one or more software modules for receiving data, monitoring data, transmitting data, and/or analyzing data to provide instructions to the software modules of the actuate logic 322 and/or the heat generate logic 320 and components thereof. Further, the emotion logic 324 may determine emotions of the first user 106 (FIG. 2B) and provide those emotion determinations to the second electronic control unit 330 (FIG. 3A) for execution as described in greater detail herein. That is, the emotion logic 324 may monitor the first user 106 (FIG. 2B) for a plurality of predetermined emotion properties and determine the specific emotion being exhibited. The emotion logic 324 may then transmit the data related to the specific predetermined emotion properties and/or emotion data related to the specific emotion being exhibited to the second electronic control unit 330 (FIG. 3A), as discussed in greater detail herein.

In some embodiments, the emotion logic 324 receives emotion data related to the specific emotion being exhibited by the second user 108 (FIG. 2B) from the second electronic control unit 330 (FIG. 3A). The emotion logic 324 determines the type of emotion (e.g., happy, sad, excited, and the like) and controls the software modules of the actuate logic 322 and/or the heat generate logic 320 to convey the determined emotions by simulating a plurality of predetermined emotion properties using the one or more heat generating devices 128 (FIG. 1) and the plurality of actuators 130 (FIG. 1). For example, if a sad emotion is determined, the predetermined emotion properties may turn off the one or more heat generating devices 128 (FIG. 1) to cool the area. On the other hand, if a happy or excitement emotion is determined, then it should be appreciated that the one or more heat generating devices 128 (FIG. 1) and one or more actuators of the plurality of actuators 130 (FIG. 1) would be activated. The predetermined emotion properties may be customized by each user through the emotion logic 324.

In other embodiments, the emotion logic 324 receives emotion data concerning the second user 108 (FIG. 2B) from the second electronic control unit 330 (FIG. 3A) and the emotion data already contains the type of emotion (e.g., happy, sad, excited, and the like). In response, the emotion logic 324 may control the software modules of the actuate logic 322 and/or the heat generate logic 320 to convey the determined emotion by simulating a plurality of predetermined emotion properties using the one or more heat generating devices 128 (FIG. 1) and the plurality of actuators 130 (FIG. 1).

The simulation logic 326 may contain one or more software modules for receiving data, monitoring data, transmitting data, and/or analyzing data to provide instructions to the software modules of the movement logic 318, the actuate logic 322 and/or the heat generate logic 320 and components thereof. Further, the simulation logic 326 may receive data related to movements of the second user 108 (FIG. 2B), determine those movements of the second user 108 (FIG. 2B), and provide those movement determinations other components of the first electronic control unit 300 (FIG. 3A) such that the movements may be simulated. That is, the simulation logic 326 may monitor for communications or data from the second electronic control unit 330 (FIG. 3A), or elsewhere, in which the data may include a plurality of different movement data to determine the specific movement being exhibited by the second user 108 (FIG. 2B). The simulation logic 326 may then control the software modules of the movement logic 318, the actuate logic 322 and/or the heat generate logic 320 to convey the specific movement being exhibited by simulating the plurality of different movement data using the plurality of monitors 104 (FIG. 1), the one or more heat generating devices 128 (FIG. 1) and the plurality of actuators 130 (FIG. 1).

For example, when the second user 108 (FIG. 2B) is determined to lean on the object 114b (FIG. 2B) towards the first user 106 (FIG. 2B), the plurality of different movement data would mimic such movement by displaying the movement on the plurality of monitors 104 (FIG. 1) and may also actuate one or more actuators of the plurality of actuators 130 (FIG. 2A) such that the first user 106 (FIG. 2B) may see the movement and feel the movement. The plurality of different movements may be customized by each user through the simulation logic 326. For example, when the second user 108 (FIG. 2B) is determined to lean on the object 114b (FIG. 2B) towards the first user 106 (FIG. 2B), in some customized setting, the lean would be displayed on the plurality of monitors 104 (FIG. 1), but at least one of the plurality of actuators 130 (FIG. 2A) would not be actuated. On the other hand, a different user may customize the settings such that the lean would be displayed on the plurality of monitors 104 (FIG. 1), the at least one actuator of the plurality of actuators 130 (FIG. 2B) would actuate, and the one or more heat generating devices 128 (FIG. 2B) may actuate to simulate the second user 108 being closer to the first user 106.

In other embodiments, the simulation logic 326 receives movement data concerning the second user 108 from the second electronic control unit 330 (FIG. 3A) and the movement data already contains the type of movement (e.g., rotation, lean, stand, sit, and the like). In response, the simulation logic 326 may control the software modules of the movement logic 318, the actuate logic 322 and/or the heat generate logic 320 to convey the determined movement by simulating the movement to enhance the sensation of the second user 108 being present in the telepresence room 102 (FIG. 1) using the plurality of monitors 104 (FIG. 1), the one or more heat generating devices 128 (FIG. 2A) and the plurality of actuators 130 (FIG. 2A).

In other embodiments, the simulation logic 326 may also transmit the movement data related to the specific movements of the first user 106 (FIG. 2B) being exhibited to the second electronic control unit 330, as discussed in greater detail herein. That is, the simulation logic 326 may contain one or more software modules for transmitting data that is ascertained by the simulation logic 326 and/or by other software modules such as the movement logic 318, and components thereof. Further, the simulation logic 326 may transmit data related to movements of the first user 106 (FIG. 2B), determine those movements of the first user 106 (FIG. 2B) and provide those movement determinations and data to other components of the second electronic control unit 330 (FIG. 3A) such that the movements may be simulated.

FIG. 3C schematically depicts a block diagram of various data contained within a storage device (e.g., the data storage device 314). As shown in FIG. 3C, the data storage device 314 may include, for example, a plurality of image data 358. The data captured from the image capturing device 122 (FIG. 1) and/or the plurality of sensors 126 (FIG. 1) may be stored as the plurality of image data 358. It should be appreciated that while the data captured from the image capturing device 122 (FIG. 1) and/or the plurality of sensors 126 (FIG. 1) may be recorded as the plurality of image data 358, the data may be live streamed to the plurality of monitors 104 (FIG. 1), as discussed in greater detail herein. Further, the plurality of image data 358 may be recalled and extracted after being recorded for use by the user. As such, it should be appreciated that the plurality of image data 358 may not be stored permanently, but instead may be stored temporarily such that the data may be extracted therefrom. It should also be appreciated that any image processing technology may be used to process images from the image capturing device 122 (FIG. 1) and/or the plurality of sensors 126 (FIG. 1).

The data storage device 314 may further include, for example, a plurality of thermal image data 360. The data captured from the thermal image capturing device 124 (FIG. 1) and/or the plurality of sensors 126 (FIG. 1) may be stored as the plurality of thermal image data 360. It should be appreciated that while the data captured from the thermal image capturing device 124 (FIG. 1) and/or the plurality of sensors 126 (FIG. 1) may be recorded as the plurality of thermal image data 360, the data may be live streamed to the plurality of monitors 104 (FIG. 1), as discussed in greater detail herein. Further, the plurality of thermal image data 360 may be recalled and extracted after being recorded for use by the user. As such, it should be appreciated that the plurality of thermal image data 360 may not be stored permanently, but instead may be stored temporarily such that the data may be extracted therefrom. It should also be appreciated that any image processing technology may be used to process images from the thermal image capturing device 124 (FIG. 1) and/or the plurality of sensors 126 (FIG. 1).

The data storage device 314 may further include, for example, a user position data 362. The user position data 362 may store data related to the real time position of the first user 106 within the telepresence room 102 (FIG. 1). For example, whether the first user 106 is positioned on the object 114a (FIG. 1), positioned standing on the floor 112 (FIG. 1), and the like. The user position data 362 may be gathered by a plurality of components, such as the image capturing device 122 (FIG. 1), the thermal image capturing device 124, (FIG. 1), the plurality of sensors 126 (FIG. 1) and the like. Further, the user position may be received data related to the real time position of the second user 108 (FIG. 2B) provided by the second electronic control unit 330 (FIG. 3A).

Still referring to FIG. 3C, the data storage device 314 may further include, for example, a user movement data 364. The user movement data 364 may store data related to the real time movement of the first user 106 within the telepresence room 102 (FIG. 1). For example, whether the first user 106 is moving on the object 114a (FIG. 1), such as scuttling, shifting, rotating, leaning, and the like. Further, whether the first user 106 is moving along the floor 112, such as walking, running, jumping, and the like. The user movement data 364 may be gathered by a plurality of components, such as the image capturing device 122 (FIG. 1), the thermal image capturing device 124, (FIG. 1), the plurality of sensors 126 (FIG. 1) and the like. Further, the user movement may be received data related to the real time movement of the second user provided by the second electronic control unit 330 (FIG. 3A).

The data storage device 314 may further include, for example, a plurality of sensor data 366. The plurality of sensor data 366 may store data related to the real time breathing, heart rate, temperature, emotions, and the like, of the first user 106 within the telepresence room 102 (FIG. 1). The plurality of sensor data 366 may be gathered by a plurality of components, such as the image capturing device 122 (FIG. 1), the thermal image capturing device 124, (FIG. 1), the plurality of sensors 126 (FIG. 1) and the like. Further, data related to the real time breathing, heart rate, temperature, emotions, and the like, of the second user 108 provided by the second electronic control unit 330 (FIG. 3A) may be stored as the plurality of sensor data 366.

The data storage device 314 may further include, for example, a heat device data 368. The heat device data 368 may store data related to the one or more heat generating devices 128 (FIG. 1). For example, the type of heat device, the position, the temperature range and the like. Additionally, the heat device data 368 may store data related to the heat generation devices such as which heat generation devices to activate for different emotions, predetermined temperatures ranges based on the purpose of activation, whether an emotion or movement triggers the actuation, and the like. Further, the heat device data 368 may include customized data for each user. For example, which emotions triggers which heat devices and at what temperature.

Still referring to FIG. 3C, the data storage device 314 may further include, for example, an actuation device data 370. The actuation device data 370 may store data related to the plurality of actuators 130 (FIG. 1). For example, the type of actuator, the position, the movement or pressure range and the like. Additionally, the actuation device data 370 may store data related to the actuator devices such as which actuator devices to actuate for different emotions or movements, predetermined movement or pressure ranges of the actuator based on the purpose of actuation, intervals or patterns or movement, whether an emotion or movement triggers the actuation, and the like. Further, the actuation device data 370 may include customized data for each user. For example, which movements trigger which actuator of the plurality of actuators and at what movement rate, pressure, and the like.

The data storage device 314 may further include, for example, a plurality of emotion data 371. The plurality of emotion data 371 may store data related to the one or more emotions. That is, the plurality of emotion data 371 may store data related to the type of emotion such as increased/decreased breathing rates and/or patterns, increased/decreased heart rates, increased/decreased temperatures, facial expressions, speech changes, and the like. The data may be gathered from users and saved and/or may be added to the repository via the network 328 (FIG. 2A) and/or by other methods known to those skilled in the art. Further, the plurality of emotion data 371 may include data regarding the predetermined emotion properties for each emotion type. That is, based on the determined type of emotion, the predetermined emotion properties includes data that assists the telepresence system 100 (FIG. 1) in responding to the determined emotion type. It should be understood that the predetermined emotion properties may contain data that is customizable by a user to have particular outputs when a particular emotion type is determined. That is, based on the determined type of emotion, the at least one heat generating device may be activated or deactivated, at least one actuator of the plurality of actuators may be actuated or unactuated, and the like.

For example, if a sad emotion is determined, the predetermined emotion properties may be to turn off the heat generating devices or turn on an air-conditioning function to cool the area. On the other hand, if a happy or excitement emotion is determined, then the predetermined emotion properties may be to activate the one or more heat generating devices and actuate one or more actuators of the plurality of actuators.

Figure 3D:
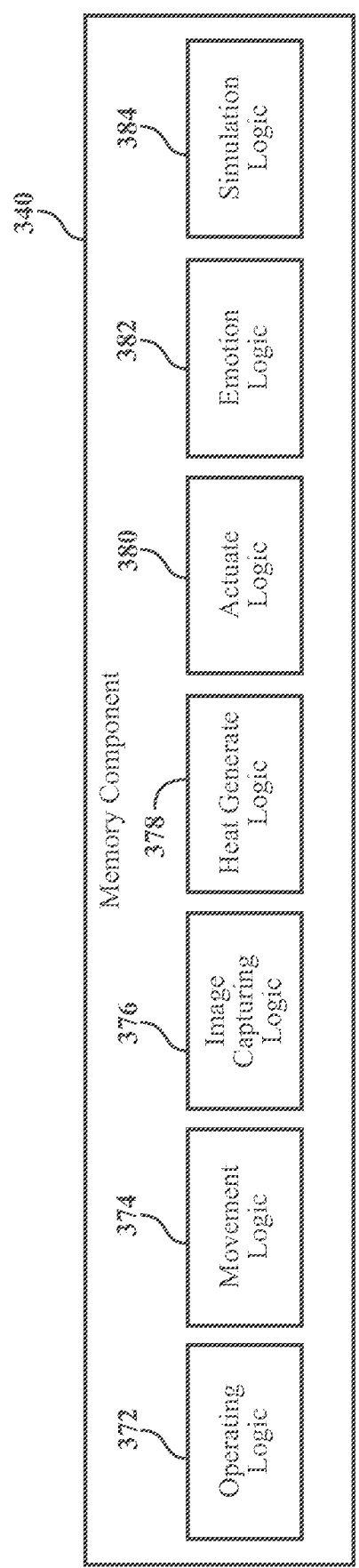
FIG. 3D schematically depicts logic modules of an example memory component of the example second electronic control unit of FIG. 3A according to one or more embodiments described and illustrated herein.

Now referring to FIG. 3D, in some embodiments, the program instructions contained on the memory component 340 may be embodied as a plurality of software modules, where each module provides programming instructions, machine readable and executable instructions, and/or the like, for completing one or more tasks. The programming instructions, machine readable and executable instructions, and the like may comprise logic or algorithm(s) written in any programming language of any generation (e.g., 1GL, 2GL, 3GL, 4GL, or 5GL) such as, for example, machine language that may be directly executed by the processor 304, or assembly language, object-oriented programming (OOP), scripting languages, microcode, and the like, that may be compiled or assembled into machine readable and executable instructions and stored on the one or more memory component 340. Alternatively, the programming instructions, machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

For example, FIG. 3D schematically depicts the memory component 340 containing illustrative logic components according to one or more embodiments shown and described herein. As shown in FIG. 3D, the memory component 340 may be configured to store various processing logic, such as, for example, an operating logic 372, a movement logic 374, an image capturing logic 376, a heat generate logic 378, an actuate logic 380, an emotion logic 382, and a simulation logic 384 (each of which may be embodied as a computer program, firmware, or hardware, as an example).

Still referring to FIG. 3D, the operating logic 372 may include an operating system and/or other software for managing components of the second electronic control unit 330 (FIG. 3A). Further, the operating logic 372 may contain one or more software modules for monitoring data, transmitting data, and/or analyzing data. The movement logic 374 may contain one or more software modules and/or other software for managing components that are communicatively coupled to the second electronic control unit 330 (FIG. 3A). Further, the movement logic 374 may contain one or more software modules for monitoring data, transmitting data, analyzing data, collecting data and/or determining a position of the second user 108 (FIG. 2B) within the at least one remote telepresence room 103 (FIG. 2A) and/or whether a movement has occurred. For example, the movement logic 374 may determine whether the second user 108 (FIG. 2B) is present in the at least one remote telepresence room 103 (FIG. 2A), whether and where the second user 108 (FIG. 2B) is positioned on the object 114b (FIG. 2B), whether the second user 108 (FIG. 2B) is walking around within the at least one remote telepresence room 103 (FIG. 2B), and the like. Additionally, the movement logic 374 may determine breathing rates and/or patterns of the second user 108 (FIG. 2B), a heart rate of the second user 108 (FIG. 2B), a temperature of the second user 108 (FIG. 2B), and the like. The movement logic 374 may collect data from one or more sources (e.g. the plurality of sensors 352, the image capturing device 350 and the thermal image capturing device 346 depicted in FIG. 3A, and/or the like), as described in greater detail herein.

The image capturing logic 376 may contain one or more software modules for receiving data, monitoring data, transmitting data, and/or analyzing data to provide the plurality of monitors 348 (FIG. 3A) and other components (e.g., the first electronic control unit 300) with the plurality of images. The image capturing logic 376 may be initiated when the second user 108 (FIG. 2B) is detected as being present in the at least one remote telepresence room 103 (FIG. 2B). As such, the image capturing logic 376 may assist in activating the image capturing device 350 (FIG. 3A) the thermal image capturing device 346 (FIG. 3A), the plurality of sensors 352 (FIG. 3A), and the like.

The heat generate logic 378 may contain one or more software modules for receiving data, monitoring data, transmitting data, and/or analyzing data to provide the object and the second user with heat based on predetermined factors that are obtained by communication with the first electronic control unit 300 (FIG. 3A). The predetermined factors may include, without limitation, movements of the first user 106 (FIG. 2B), positioning of the first user 106 (FIG. 2B), determined emotions of the first user 106 (FIG. 2B), and the like. For example, a determined happy or excited emotion of the first user 106 (FIG. 2B) may be simulated by increased heat directed to the second user 108 (FIG. 2B). As such, the heat generate logic 378 may increase a heat produced by the heat generating devices 354 (FIG. 3A). Further, the increase may between a plurality of different temperature ranges and/or intervals that may be incrementally increased based on thresholds or may be two different settings such as between a ⊔ high⊔ setting and a ⊔ normal⊔ setting.

The actuate logic 380 may contain one or more software modules for receiving data, monitoring data, transmitting data, and/or analyzing data to provide the object 114b (FIG. 2B) and the second user 108 (FIG. 2B) with a simulated movement or touch based on predetermined factors that are obtained by communication with the first electronic control unit 300 (FIG. 3A). The predetermined factors may include, without limitation, movements of the first user 106 (FIG. 2B), positioning of the first user 106 (FIG. 2B), determined emotions of the first user 106 (FIG. 2B), and the like. For example, a determined happy or excited emotion of the first user 106 (FIG. 2B) may be simulated by an actuation of one or more actuators of the plurality of actuators 356 (FIG. 3A) to simulate a touch, a hug, and the like of the first user 106 (FIG. 2B) upon the second user 108 (FIG. 2B). As such, the actuate logic 380 may actuate one or more actuators of the plurality of actuators 356 (FIG. 3A) between a plurality of different movement and pressure ranges and/or intervals that may be incrementally increased based on thresholds or may be two different settings such as between a ∟ high⊔ setting and a ⊔ normal⊔ setting.

The emotion logic 382 may contain one or more software modules for receiving data, monitoring data, transmitting data, and/or analyzing data to provide instructions to the software modules of the actuate logic 380 and/or the heat generate logic 378 and components thereof. Further, the emotion logic 382 may determine emotions of the second user 108 (FIG. 2B) and provide those emotion determinations to the first electronic control unit 300 (FIG. 3A) for execution as described in greater detail herein. That is, the emotion logic 382 may monitor the second user 108 (FIG. 2B) for a plurality of predetermined emotion properties and determine the specific emotion being exhibited. The emotion logic 382 may then transmit the data related to the specific predetermined emotion properties and/or emotion data related to the specific emotion being exhibited to the first electronic control unit 300 (FIG. 3A), as discussed in greater detail herein.

In some embodiments, the emotion logic 382 receives emotion data related to the specific emotion being exhibited by the first user 106 (FIG. 2B) from the first electronic control unit 300 (FIG. 3A). The emotion logic 382 determines the type of emotion (e.g., happy, sad, excited, and the like) and controls the software modules of the actuate logic 380 and/or the heat generate logic 378 to convey the determined emotions by simulating a plurality of predetermined emotion properties using the heat generating devices 354 (FIG. 3A) and the plurality of actuators 356 (FIG. 3A). For example, if a sad emotion is determined, the predetermined emotion properties may be to turn off the heat generating devices 354 (FIG. 3A) or turn on an air-conditioning function to cool the area. On the other hand, if a happy or excitement emotion is determined, then it should be appreciated that the heat generating devices 354 (FIG. 3A) and one or more actuators of the plurality of actuators 356 (FIG. 3A) may be activated. The predetermined emotion properties may be customized by each user through the emotion logic 382.

In other embodiments, the emotion logic 382 receives emotion data concerning the first user 106 (FIG. 2B) from the first electronic control unit 300 (FIG. 3A) and the emotion data already contains the type of emotion (e.g., happy, sad, excited, and the like). In response, the emotion logic 382 may control the software modules of the actuate logic 380 and/or the heat generate logic 378 to convey the determined emotion by simulating a plurality of predetermined emotion properties using the heat generating devices 354 (FIG. 3A) and the plurality of actuators 356 (FIG. 3A).

The simulation logic 384 may contain one or more software modules for receiving data, monitoring data, transmitting data, and/or analyzing data to provide instructions to the software modules of the movement logic 374, the actuate logic 380 and/or the heat generate logic 378 and components thereof. Further, the simulation logic 384 may receive data related to movements of the first user 106 (FIG. 2B), determine those movements of the first user 106 (FIG. 2B) and provide those movement determinations to other components of the second electronic control unit 330 (FIG. 3A) such that the movements of the first user 106 (FIG. 2B) may be simulated. That is, the simulation logic 384 may monitor for communications or date transmitted from the first electronic control unit 300 (FIG. 3A), or elsewhere, that includes a plurality of different movement data and determine the specific movement being exhibited by the first user 106 (FIG. 2B). The simulation logic 384 may then control the software modules of the movement logic 374, the actuate logic 380 and/or the heat generate logic 378 to convey the specific movement being exhibited by the first user 106 (FIG. 2B) to simulate the plurality of different movement data using the plurality of monitors 348 (FIG. 3A), the heat generating devices 354 (FIG. 3A) and/or the plurality of actuators 356 (FIG. 3A).

For example, when the first user 106 (FIG. 2B) is determined to lean on the object towards the second user 108 (FIG. 2B), the plurality of different movement data would mimic such movement by displaying the movement on the plurality of monitors 348 (FIG. 3A) and may also actuate one or more actuators of the plurality of actuators 356 (FIG. 3A) such that the second user 108 (FIG. 2B) may see the movement and feel the movement of the first user 106 (FIG. 2B). The plurality of different movements may be customized by each user through the simulation logic 384. For example, when the first user 106 (FIG. 2B) is determined to lean on the object 114a (FIG. 1) towards the second user 108 (FIG. 2B), in some customized settings, the lean would be displayed on the plurality of monitors 348 (FIG. 3A), but at least one of the plurality of actuators 356 (FIG. 3A) would not be actuated. On the other hand, a different user may customize the settings such that the lean would be displayed on the plurality of monitors 348 (FIG. 3A), the at least one of the plurality of actuators 356 (FIG. 3A) would actuate, and one of the heat generating devices 354 (FIG. 3A) may actuate to simulate the first user 106 being positioned closer to the second user 108.

In other embodiments, the simulation logic 384 receives movement data concerning the first user 106 (FIG. 2B) from the first electronic control unit 300 (FIG. 3A) and the movement data already contains the type of movement (e.g., rotation, lean, stand, sit, and the like). In response, the simulation logic 384 may control the software modules of the movement logic 374, the actuate logic 380 and/or the heat generate logic 378 to convey the determined movement by simulating the movement of the first user 106 (FIG. 2B) to enhance the sensation of the first user 106 (FIG. 2B) being present in the at least one remote telepresence room 103 (FIG. 2A) using the plurality of monitors 348 (FIG. 3A), the heat generating devices 354 (FIG. 3A) and the plurality of actuators 356 (FIG. 3A).

In other embodiments, the simulation logic 384 may also transmit the movement data related to the specific movements of the second user 108 (FIG. 2B) being exhibited to the first electronic control unit 300 (FIG. 3A), as discussed in greater detail herein. That is, the simulation logic 384 may contain one or more software modules for transmitting data that is ascertained by the simulation logic 384 and/or by other software modules such as the movement logic 374, and components thereof. Further, the simulation logic 384 may transmit data related to movements of the second user 108 (FIG. 2B), determine those movements of the second user 108 (FIG. 2B) and provide those movement determinations to other components of the first electronic control unit 300 (FIG. 3A) such that the movements may be simulated.

Figure 3E:
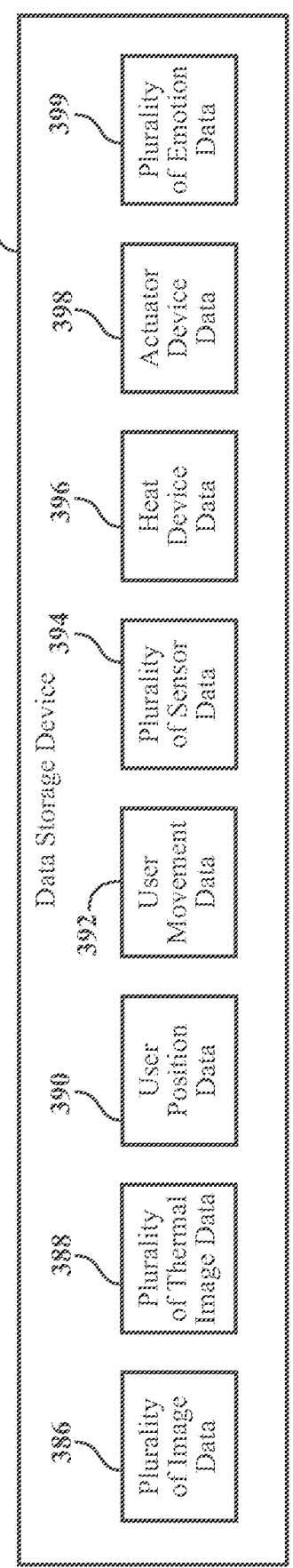
FIG. 3E schematically depicts example data stored within an example data storage device of the example second electronic control unit of FIG. 3A according to one or more embodiments described and illustrated herein.

Now referring to FIG. 3E, which schematically depicts a block diagram of various data contained within a storage device (e.g., the data storage device 344). As shown in FIG. 3E, the data storage device 344 may include, for example, a plurality of image data 386. The data captured from the image capturing device 350 (FIG. 3A) and/or the plurality of sensors 352 (FIG. 3A) may be stored as the plurality of image data 386. It should be appreciated that while the data captured from the image capturing device 350 (FIG. 3A) and/or the plurality of sensors 352 (FIG. 3A) may be recorded as the plurality of image data 386, the data may be live streamed to the plurality of monitors 348 (FIG. 3A), as discussed in greater detail herein. Further, the plurality of image data 386 may be recalled and extracted after being recorded for use by the user. As such, it should be appreciated that the plurality of image data 386 may not be stored permanently, but instead may be stored temporarily such that the data may be extracted therefrom. It should also be appreciated that any image processing technology may be used to process images from the image capturing device 350 (FIG. 3A) and/or the plurality of sensors 352 (FIG. 3A).

The data storage device 344 may further include, for example, a plurality of thermal image data 388. The data captured from the thermal image capturing device 346 (FIG. 3A) and/or the plurality of sensors 352 (FIG. 3A) may be stored as the plurality of thermal image data 388. It should be appreciated that while the data captured from the thermal image capturing device 346 (FIG. 3A) and/or the plurality of sensors 352 (FIG. 3A) may be recorded as the plurality of thermal image data 388, the data may be live streamed to the plurality of monitors 348 (FIG. 3A), as discussed in greater detail herein. Further, the plurality of thermal image data 388 may be recalled and extracted after being recorded for use by the user. As such, it should be appreciated that the plurality of thermal image data 388 may not be stored permanently, but instead may be stored temporarily such that the data may be extracted therefrom. It should also be appreciated that any image processing technology may be used to process images from the thermal image capturing device 346 (FIG. 3A) and/or the plurality of sensors 352 (FIG. 3A).

The data storage device 344 may further include, for example, a user position data 390. The user position data 390 may store data related to the real time position of the second user 108 (FIG. 2B) within the at least one remote telepresence room 103 (FIG. 2A). For example, whether the second user 108 (FIG. 2B) is positioned on the object 114b (FIG. 2B), positioned standing on the floor, and the like. The user position data 390 may be gathered by a plurality of components, such as the image capturing device 350 (FIG. 3A), the thermal image capturing device 346 (FIG. 3A), the plurality of sensors 352 (FIG. 3A) and the like. Further, the user position may be received data related to the real time position of the first user provided by the first electronic control unit 300 (FIG. 3A).

The data storage device 344 may further include, for example, a user movement data 392. The user movement data 392 may store data related to the real time movement of the second user 108 (FIG. 2B) within the at least one remote telepresence room 103 (FIG. 2A). For example, whether the second user is moving on the object 114b (FIG. 2B), such as scuttling, shifting, rotating, leaning, and the like. Further, whether the second user 108 (FIG. 2B) is moving along the floor surface 112, such as walking, running, jumping, and the like. The user movement data 392 may be gathered by a plurality of components, such as the image capturing device 350 (FIG. 3A), the thermal image capturing device 346 (FIG. 3A), the plurality of sensors 352 (FIG. 3A) and the like. Further, the user movement may be received data related to the real time movement of the first user provided by the first electronic control unit 300 (FIG. 3A).

The data storage device 344 may further include, for example, a plurality of sensor data 394. The plurality of sensor data 394 may store data related to the real time breathing, heart rate, temperature, emotions, and the like, of the second user 108 (FIG. 2B) within the telepresence room 102 (FIG. 1). The plurality of sensor data 394 may be gathered by a plurality of components, such as the image capturing device 350 (FIG. 3A), the thermal image capturing device 346 (FIG. 3A), the plurality of sensors 352 (FIG. 3A), and the like. Further, data related to the real time breathing, heart rate, temperature, emotions, and the like, of the first user 106 provided by the first electronic control unit 300 (FIG. 3A) may be stored as the plurality of sensor data 394.

The data storage device 344 may further include, for example, a heat device data 396. The heat device data 396 may store data related to the one or more heat generating devices 354 (FIG. 3A). For example, the type of heat generating devices, the position of the heat generating devices, the temperature ranges and the like. Additionally, the heat device data 396 may store data related to the heat generating devices such as which heat generating devices to actuate for different emotions, predetermined temperatures ranges based on the purpose of actuation, an interval or pattern to activate with, whether an emotion or movement triggers the actuation, and the like. Further, the heat device data 396 may include customized data for each user. For example, which emotions triggers which heat generating devices 354 (FIG. 3A) and at what temperature.

The data storage device 344 may further include, for example, an actuation device data 398. The actuation device data 398 may store data related to the plurality of actuators 356 (FIG. 3A). For example, the type of actuators, the position of the actuator, the movement or pressure range and the like. Additionally, the actuation device data 398 may store data related to the actuator devices such as which actuator devices to actuate for different emotions or movements, predetermined movement or pressure ranges of the actuator based on the purpose of actuation, whether an emotion or movement triggers the actuation, and the like. Further, the actuation device data 398 may include customized data for each user. For example, which movements triggers which actuator of the plurality of actuators 356 (FIG. 3A) and at what movement rate, pressure, and the like.

The data storage device 344 may further include, for example, a plurality of emotion data 399. The plurality of emotion data 399 may store data related to the one or more emotions. That is, the plurality of emotion data 399 may store data related to the type of emotion such as increased/decreased breathing rates and/or patterns, increased/decreased heart rates, increased/decreased temperatures, facial expressions, speech changes, and the like. The data may be gathered from users and saved and/or may be added to the repository via the network 328 (FIG. 2A) and/or by other methods known to those skilled in the art. Further, the plurality of emotion data 399 may include data regarding the predetermined emotion properties for each emotion type. That is, based on the determined type of emotion, the predetermined emotion properties includes data that assists the telepresence system 100 (FIG. 1) in responding to the determined emotion type. It should be understood that the predetermined emotion properties may contain data that is customizable by a user to have particular outputs when a particular emotion type is determined. That is, based on the determined type of emotion, the at least one heat generating device may be activated or deactivated, at least one actuator of the plurality of actuators may be actuated or unactuated, and the like.

For example, if a sad emotion is determined, the predetermined emotion properties may be to turn off the heat generating devices or turn on an air-conditioning function to cool the area. On the other hand, if a happy or excitement emotion is determined, then the predetermined emotion properties may be to activate the one or more heat generating devices and actuate one or more actuators of the plurality of actuators.

It should be understood that the components illustrated in FIGS. 3A-3E are merely illustrative and are not intended to limit the scope of this disclosure. More specifically, while the components in FIGS. 3A-3E are illustrated as residing within the first electronic control unit 300 and/or the second electronic control unit 330, respectively, of the telepresence system 100, this is a non-limiting example. In some embodiments, one or more of the components may reside external to the first electronic control unit 300, the second electronic control unit 330, and/or the telepresence system 100 (FIG. 1).

As mentioned above, the various components described with respect to FIGS. 3A-3E may be used to carry out one or more processes for a providing an enhanced or improved sensation that one or more persons or pets are within the telepresence room with the user.

Figure 4:
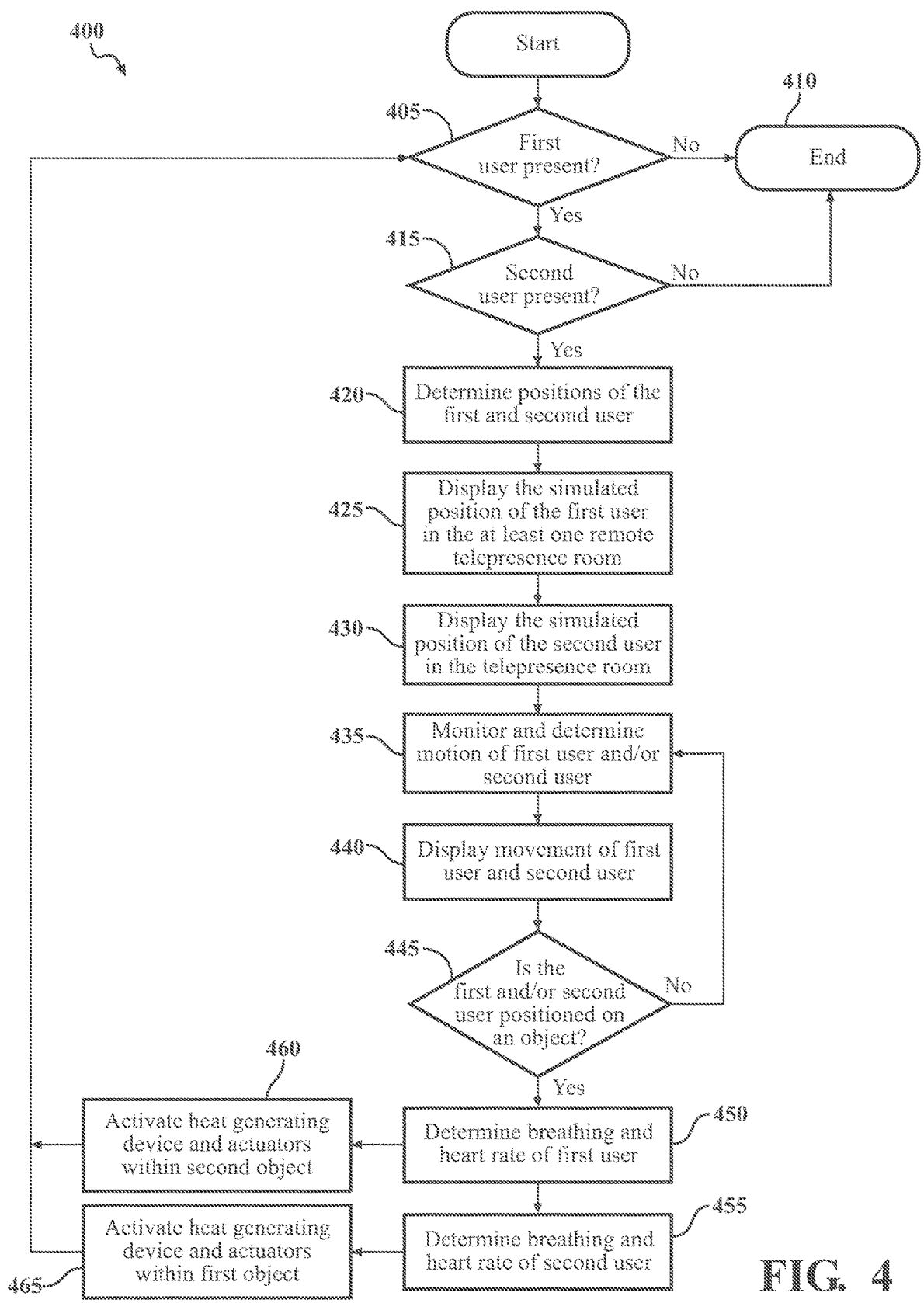
FIG. 4 graphically depicts a flowchart of an example method of enhancing a sensation that more than one person is present in a telepresence room according to one or more embodiments shown and described herein.

FIG. 4 depicts an illustrative method 400 for enhancing a sensation that more than one person is present in a telepresence room by providing a customizable plurality of options such as generating a heat to mimic or simulate specific emotions or breathing rates and/or patterns, and actuating a plurality of actuators to mimic a heart beat, a movement, and the like of the simulated person within the telepresence room. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

At block 405, the system determines whether the first user is present within the telepresence room. It should be understood that the system may determine the presence of the first user via the plurality of sensors, the thermal image capturing device, the image capturing device, the floor displays, and the like, of the telepresence room. If the first user is determined to not be present within the telepresence room, the method 400 ends at block 410. If the system determines that the first user is present within the telepresence room, then the system determines whether the second user is present within the at least one remote telepresence room, at block 415. It should be understood that the system may determine the presence of the second user via the plurality of sensors, the thermal image capturing device, the image capturing device, the floor displays, and the like, of the at least one remote telepresence room. If the second user is determined to not be present within the at least one remote telepresence room, the method 400 ends at block 410. Further, it should be understood that the method 400 is not limited to only a second user and that there may be a plurality of additional users, a plurality of additional remote telepresence rooms, more than one user in any telepresence room, and the like.

With the first and second users present in the respective telepresence rooms, the system determines the position of the first and second users, at block 420. It should be appreciated that the position of the first and second users may be determined using the plurality of sensors, the thermal image capturing device, the image capturing device, the floor displays, and the like, disposed in the telepresence room and the at least one remote telepresence room. Once the position of the first and second users are determined, the system displays a simulation of the position of the first user within the at least one remote telepresence room, at block 425, and displays a simulation of the second user positioned with the telepresence room, at block 430. That is, the system will simulate the location of the first user in the plurality of monitors and/or the floor monitors within the at least one remote telepresence room and the system will simulate the location of the second user in the plurality of monitors and/or the floor monitors within the telepresence room.

In one example, if the system determines that first user is positioned on the couch within the telepresence room, the system will simulate the first user positioned on the couch within the at least one remote telepresence room on the plurality of monitors within the at least one remote telepresence room. As such, the second user will see displayed on the plurality of monitors, the first user positioned on the couch. In some embodiments, if the second user is also sitting on the couch, the system sill simulate the first user as being positioned next to the second user on the couch together.

In another example, the system will simulate the second user positioned on the couch within the telepresence room on the plurality of monitors within the telepresence room. As such, the first user will see displayed on the plurality of monitors, the second user positioned on the couch. In some embodiments, if the first user is also sitting on the couch, the system sill simulate the second user as being positioned next to the first user on the couch together.

In yet another example, the system may determine that first user and/or second user is standing on the floor in the respective telepresence room. In response, the system may display footprints, graphics or other indicia to indicate the position of the first user and/or second user with the opposite telepresence rooms.

At block 435, the system monitors for and determines any motion of the first and second users. It should be appreciated that motion may be any type of movement including walking swaying, sitting, leaning, moving any appendages, and the like. It should also be appreciated that the movement of the first and second users may be determined using the plurality of sensors, the thermal image capturing device, the image capturing device, the floor displays, and the like, disposed in the telepresence room and the at least one remote telepresence room. Once a motion of the first and/or second users are determined, the system displays a simulation of the motion of the first user on the plurality of monitors user within the at least one remote telepresence room, and/or displays a simulation of the motion of the second user on the plurality of monitors within the telepresence room, at block 440. That is, the system will simulate the movement of the first user in the plurality of monitors and/or the floor monitors within the at least one remote telepresence room and the system will simulate the movement of the second user in the plurality of monitors and/or the floor monitors within the telepresence room.

At block 445, the system will determine whether the first user and/or the second user is positioned on the object (e.g., on a couch, a bed, and the like) or has an object in contact with the user (e.g., a blanket, a robe, and the like) equipped with the components to enhance the sensation of more than one user being present within the telepresence room. If the system determines that the first user and/or the second user is not positioned on the object or in possession of the object in contact with the user, then the system monitors for and determines additional motions of the first and second users, at block 435. If the system determines that the first user and/or the second user is positioned on the object or has an object in contact with the user, then, at block 450, the system determines a breathing motion and a heart rate of the first user and/or at block 455, the system determines a breathing motion and a heart rate of the second user. It should be appreciated that breathing motion of the first and second users may be any type of movement including chest movement, air movement, change in temperature between inhales and exhales, and the like. Further, the heart rate may be determined by pulsation of the first and/or second users, twitching of appendages, and the like. It should also be appreciated that the breathing motion and heart rate of the first and second users may be determined using the plurality of sensors, the thermal image capturing device, the image capturing device, the floor displays, and the like, disposed in the telepresence room and the at least one remote telepresence room.

Once the breathing motion and/or heart rate of the first user is determined, the system activates the at least one heat generating device and at least one of the plurality of actuators within the second object in the at least one remote telepresence room, at block 460. It should be understood that the activation of the at least one heat generating device and at least one of the plurality of actuators within the second object is to simulate the breathing and/or heart rate of the first user being present within the at least one remote telepresence room. Additionally, once the breathing motion and/or heart rate of the second user is determined, the system activates the at least one heat generating device and at least one of the plurality of actuators within the first object in the telepresence room, at block 465. It should be understood that the activation of the at least one heat generating device and at least one of the plurality of actuators within the first object is to simulate the breathing and/or heart rate of the second user being present within the telepresence room.

Figure 5:
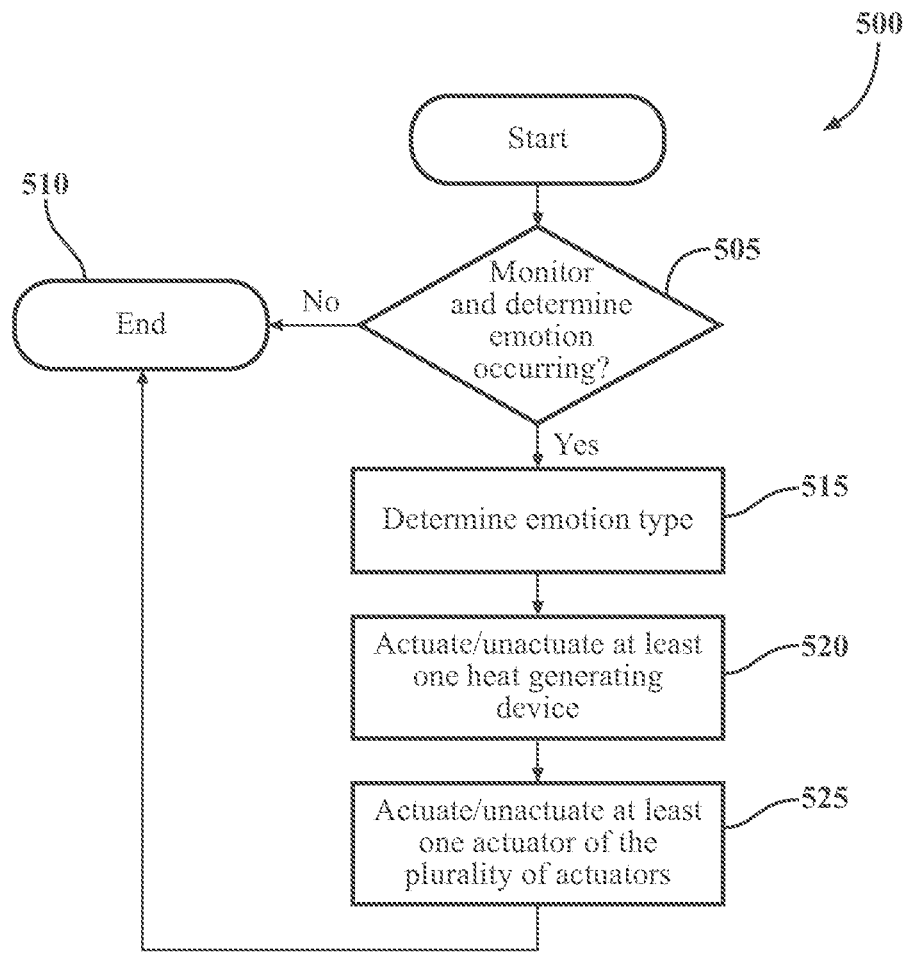
FIG. 5 graphically depicts a flowchart of an example method of enhancing a sensation that more than one person is present in a telepresence room via an emotion determination according to one or more embodiments shown and described herein.

FIG. 5 depicts an illustrative method 500 for sensing an emotion of a user to enhance a sensation that more than one person is present in a telepresence room. Although the steps associated with the blocks of FIG. 5 will be described as being separate tasks, in other embodiments, the blocks may be combined or omitted. Further, while the steps associated with the blocks of FIG. 5 will described as being performed in a particular order, in other embodiments, the steps may be performed in a different order.

At block 505, the system monitors and determines whether an emotion from the first or second users are occurring. It should be understood that the system may determine whether an emotion is occurring via the plurality of sensors, the thermal image capturing device, the image capturing device, the floor displays, and the like, positioned with the telepresence room and/or the at least one remote telepresence room. It should be understood that the method 500 is not limited to only the first and/or second users and that there may be a plurality of additional users, a plurality of additional remote telepresence rooms, more than one user in any telepresence room, and the like.

If an emotion is not occurring, at block 505, the method ends at block 510. It should be appreciated that the end at block 510 may also be where the method iteratively repeats. If the system determines that an emotion is current occurring with one of the first and/or second users, the system determines the emotion type, at block 515. The emotion type may be determined by comparing the currently occurring motion to a plurality of emotion data stored on the first and/or second electronic control units to determine the emotion type and the predetermined emotion properties for that particular emotion. For example, the determined emotion type may be a happy emotion, a sad emotion, an excited emotion, and the like. As such, because each of these emotion types invoke different responses in humans, the responses by humans may be used to determine the type of current emotion occurring. For example, an excited emotion may be determined when one's heart rate and breathing increase and a facial expression changes to a smile.

In some embodiments, the predetermined emotion properties may contain data that is customizable by a user to have particular outputs when a particular emotion type is determined. That is, based on the determined type of emotion, the at least one heat generating device may be activated or deactivated, at block 520 and at least one actuator of the plurality of actuators may be actuated or unactuated, at block 525. For example, if a sad emotion is determined, the predetermined emotion properties may be to turn off the heat generating devices or turn on an air-conditioning function to cool the area. On the other hand, if a happy or excitement emotion is determined, then the predetermined emotion properties may be to activate the one or more heat generating devices and actuate one or more actuators of the plurality of actuators.

The above-described telepresence system includes elements that provide users with an improved telepresence experience. The telepresence system according to the present specification provides an enhanced sensation that more than one person is present in a telepresence room by providing a customizable plurality of options such as generating a heat to mimic or simulate specific emotions or breathing and actuating a plurality of actuators to mimic a heat beat, a movement, and the like of the simulated person within the telepresence room. Further, the telepresence system according to the present specification provides for simulating a user within a different telepresence room, on objects within a different telepresence room, mimicking movements in the different telepresence, and the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
a plurality of monitors, a control unit, and a first object positioned in a first telepresence room, wherein:
the first object has a first location and a second location; and
a second object having one or more sensors operable to generate data, the second object is positioned to be located remote from the first object in a different telepresence room;
wherein the control unit is configured to:
determine whether a first user is positioned on the first location or on the second location of the first object positioned within the first telepresence room;
display a simulation of a second user onto the plurality of monitors disposed in the first telepresence room based on the generated data, wherein:
the second user is located in the different telepresence room remote from the first user, and the second user is displayed as being positioned in a different location on the first object than the determined position of the first user on the first object.

2. The system of claim 1, wherein the one or more sensors further generate data indicative of:
a movement of the second user,
a heart rate of the second user,
a breathing pattern of the second user, and
an emotion of the second user.

3. The system of claim 2, further comprising:
at least one actuator positioned within the first object,
wherein the control unit is further configured to:
actuate the at least one actuator positioned within the first object to simulate the breathing pattern and the heart rate of the second user based on the generated data of the second user.

4. The system of claim 3, wherein the at least one actuator actuates at a predetermined interval.

5. The system of claim 4, wherein the at least one actuator actuates to simulate the breathing pattern and the heart rate of the second user based on the generated data of the second user.

6. The system of claim 1, wherein the first object further comprising:
one or more heat generating devices positioned within the first object,
wherein the control unit is further configured to:
activate the one or more heat generating devices to simulate a presence of the second user being positioned in the different location on the first object such that the second user is simulated as being positioned within the first telepresence room and on the first object along with the first user and the one or more heat generating devices actuate at a predetermined interval or with a predetermined pattern.

7. The system of claim 6, wherein the one or more heat generating devices actuate to simulate the presence of the second user being positioned at the location different from the location of the first user.

8. The system of claim 6, wherein the one or more heat generating devices actuate to a higher heat temperature to simulate the emotion of the second user based on the generated data of the second user.

9. The system of claim 2, wherein the control unit is further configured to:
receive the emotion data,
determine an emotion type based on the emotion data,
determine a plurality of predetermined emotion properties, and
activate the one or more heat generating devices based on the determined plurality of predetermined emotion properties.

10. A method of enhancing a sensation of a second user being present in a telepresence room, the second user is remote to the telepresence room, the method comprising:
determining, by one or more sensors, a location of a first user within the telepresence room, the telepresence room having a plurality of monitors and a first object, wherein the first object has a plurality of locations for the first user to be positioned thereon;
determining, by the one or more sensors, a generated data of a position of the second user positioned on a second object;
displaying, by a control unit onto the plurality of monitors disposed in the telepresence room, a simulation of the second user positioned on the first object in a location of the plurality of locations that is different from the determined location of the first user; and activating, by the control unit, at least one actuator positioned within the first object;

wherein the second user is simulated as being positioned on the first object adjacent to the first user by a movement caused by the at least one actuator and a simulated display of the second user on the plurality of monitors.

11. The method of claim 10, wherein the one or more sensors is configured to generate data further generate data indicative of:

a presence of the second user,
a movement of the second user,
a heart rate of the second user,
a breathing pattern of the second user, and
an emotion of the second user.

12. The method of claim 11, wherein the at least one actuator actuates to simulate the breathing pattern and the heart rate of the second user based on the generated data of the second user.

13. The method of claim 12, wherein the at least one actuator actuates at a predetermined interval.

14. The method of claim 10, further comprising:

activating, by the control unit, one or more heat generating devices positioned within the first object, a heat generated by the one or more heat generating devices, wherein the one or more heat generating devices actuate to change a temperature to simulate the presence of the second user being positioned at the different location of the plurality of locations that the first user is positioned thereon.

15. The method of claim 14, wherein the one or more heat generating devices actuate at a predetermined interval or with a predetermined pattern.

16. The method of claim 14, wherein the one or more heat generating devices actuate to a higher heat temperature to simulate an emotion of the second user based on the generated data of the second user.

17. The method of claim 11, wherein the control unit is further configured to:

receive the emotion data,
determine an emotion type based on the emotion data,
determine a plurality of predetermined emotion properties, and
activate one or more heat generating devices based on the determined plurality of predetermined emotion properties.

18. The method of claim 11, wherein the one or more sensors detect the movement of the second user by sensing a rotation.

19. A telepresence system comprising:

a plurality of monitors, a control unit, and a first object positioned in a first telepresence room wherein:
  the first object has a first location position and a second location position; and
a second object having one or more sensors operable to generate data, the second object is positioned in a different telepresence room than to the first object;
wherein the control unit is configured to:
  determine whether a first user is positioned on the first location position or on the second location position of the first object;
  display a simulation of a second user onto the plurality of monitors based on the generated data of a determined location of the second user position on the second object, wherein:
    the second user is positioned in the different telepresence room from the first user positioned in the first telepresence room, and
    the second user is displayed as being positioned in a different location position on the first object than the determined location position of the first user on the first object;
  receive an emotion data indicative of an emotion of the second user;
  determine an emotion type of the emotion data; and
  determine a plurality of predetermined emotion properties.

20. The telepresence system of claim 19, further comprising:

one or more heat generating devices positioned within the first object; and
at least one actuator positioned within the first object, and
wherein the control unit is configured to:
  actuate the at least one actuator positioned within the first object to simulate to simulate the emotion of the second user based on the plurality of predetermined emotion properties; and
  activate the one or more heat generating devices based on the plurality of predetermined emotion properties to simulate the emotion of the second user such that the emotion of the second user is simulated to the first user.

* * * * *

UNITED STATES PATENT AND TRADEMARK OFFICE
CERTIFICATE OF CORRECTION

PATENT NO. : 11,671,563 B2
APPLICATION NO. : 17/829900
DATED : June 6, 2023
INVENTOR(S) : Stephanie Paepcke and Katherine Tsui It is certified that error appears in the above-identified patent and that said Letters Patent is hereby corrected as shown below:

In the Specification

In Column 4, Line(s) 4 & 5, delete "U communicatively coupled☐" and insert --"communicatively coupled"--, therefor.

In Column 5, Line(s) 38 & 39, delete "☐object☐ and ☐couch☐" and insert --"objects" and "couch"--, therefor.

In Column 6, Line(s) 61 & 62, delete "U body heat" and insert --"body heat"--, therefor.

In Column 6, Line(s) 65, delete "pet s" and insert --pet's--, therefor.

In Column 8, Line(s) 13 & 14, delete "☐body heat☐" and insert --"body heat"--, therefor.

In Column 8, Line(s) 17, delete "pet☐s" and insert --pet's--, therefor.

In Column 8, Line(s) 55 & 56, delete "user☐s" and insert --user's--, therefor.

In Column 12, Line(s) 20, delete "☐buttons☐" and insert --"buttons"--, therefor.

In Column 12, Line(s) 27 - 29, delete "☐INPUT DEVICES HAVING A DEFORMABLE MEMBRANE AND METHODS OF USING THE SAME☐" and insert --"INPUT DEVICES HAVING A DEFORMABLE MEMBRANE AND METHODS OF USING THE SAME"--, therefor.

In Column 12, Line(s) 36, delete "☐images☐ or ☐image☐" and insert --"images" or "image"--, therefor.

Signed and Sealed this
Second Day of July, 2024

*Katherine Kelly Vidal*
Katherine Kelly Vidal
*Director of the United States Patent and Trademark Office*

CERTIFICATE OF CORRECTION (continued)
U.S. Pat. No. 11,671,563 B2

In Column 14, Line(s) 67, delete ""signal"" and insert --"signal"--, therefor.

In Column 16, Line(s) 54, delete ""buttons"" and insert --"buttons"--, therefor.

In Column 16, Line(s) 61 - 63, delete ""INPUT DEVICES HAVING A DEFORMABLE MEMBRANE AND METHODS OF USING THE SAME"" and insert --"INPUT DEVICES HAVING A DEFORMABLE MEMBRANE AND METHODS OF USING THE SAME"--, therefor.

In Column 17, Line(s) 3, delete ""images" or "image"" and insert --"images" or "image"--, therefor.

In Column 19, Line(s) 56 & 57, delete ""high" setting and a "normal" setting" and insert --"high" setting and a "normal" setting--, therefor.

In Column 19, Line(s) 59 & 60, delete ""high" setting and a "normal" setting" and insert --"high" setting and a "normal" setting--, therefor.

In Column 20, Line(s) 10 & 11, delete ""high" setting and a "normal" setting" and insert --"high" setting and a "normal" setting--, therefor.

In Column 25, Line(s) 39, delete ""high" setting and a "normal" setting" and insert --"high" setting and a "normal" setting--, therefor.

In Column 32, Line(s) 63, delete "one's" and insert --one's--, therefor.

In the Claims

In Column 36, Line(s) 11, Claim 19, after "than", delete "to".

In Column 36, Line(s) 39, Claim 20, delete "to simulate to simulate" and insert --to simulate--, therefor.